United States Patent
Wang et al.

(10) Patent No.: US 12,513,589 B2
(45) Date of Patent: Dec. 30, 2025

(54) ADAPTIVE PHASE-CHANGING DEVICE SHARING AND HANDOVER

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 275 days.

(21) Appl. No.: 18/249,702

(22) PCT Filed: Aug. 30, 2021

(86) PCT No.: PCT/US2021/048205
§ 371 (c)(1),
(2) Date: Apr. 19, 2023

(87) PCT Pub. No.: WO2022/093380
PCT Pub. Date: May 5, 2022

(65) Prior Publication Data
US 2023/0370931 A1    Nov. 16, 2023

Related U.S. Application Data

(60) Provisional application No. 63/106,865, filed on Oct. 28, 2020.

(51) Int. Cl.
*H04W 36/30* (2009.01)
*H04W 36/08* (2009.01)

(52) U.S. Cl.
CPC ........... *H04W 36/30* (2013.01); *H04W 36/08* (2013.01)

(58) Field of Classification Search
CPC ... H04W 36/30; H04W 36/08; H04W 84/047; H04W 92/70
See application file for complete search history.

(56) References Cited

U.S. PATENT DOCUMENTS 10,700,427 B1  6/2020  Tran
11,570,629 B2* 1/2023  Haija ................... H04L 5/0048
(Continued)

FOREIGN PATENT DOCUMENTS

CN     1886965 A    12/2006
CN   111181615 A     5/2020
(Continued)

OTHER PUBLICATIONS

"Foreign Office Action", IN Application No. 202347028231, May 16, 2024, 5 pages.
(Continued)

*Primary Examiner* — Mohammad S Anwar
(74) *Attorney, Agent, or Firm* — Colby Nipper PLLC

(57) ABSTRACT

Techniques and apparatuses are described for adaptive phase-changing device sharing and handover. In aspects, a second base station shares an adaptive phase-changing device APD, with a first base station. The second base station determines to use an APD in a communication path for a second wireless link with a second user equipment. The second base station identifies a first base station using the APD in a communication path for a first wireless link with a first UE. Based on identifying the first base station using the APD, the second base station obtains apportioned access to the APD and configures a surface of the APD based on the apportioned access. The second base station uses the APD in a communication path for the second wireless link with the second UE based on the apportioned access.

18 Claims, 15 Drawing Sheets

(56) References Cited

U.S. PATENT DOCUMENTS

| | | |
|---|---|---|
| 2010/0144356 A1 | 6/2010 | Li et al. |
| 2012/0315916 A1 | 12/2012 | Van Phan et al. |
| 2015/0195830 A1 | 7/2015 | Takeda et al. |
| 2018/0351605 A1 | 12/2018 | Liang et al. |
| 2019/0357069 A1 | 11/2019 | Harada et al. |
| 2020/0227812 A1 | 7/2020 | Sun et al. |
| 2020/0272899 A1 | 8/2020 | Dunne et al. |

FOREIGN PATENT DOCUMENTS

| | | | |
|---|---|---|---|
| CN | 112601242 | 4/2021 | |
| EP | 3919929 A1 * | 12/2021 | ......... H04B 7/04013 |
| WO | 2020254030 | 12/2020 | |
| WO | 2022000408 | 1/2022 | |
| WO | 2022093380 | 5/2022 | |

OTHER PUBLICATIONS

"International Search Report and Written Opinion", Application No. PCT/US2021/048205, Jan. 31, 2022, 17 pages.

"Invitation to Pay Additional Fees and Partial Search Report", Dec. 7, 2021, 11 pages.

Hashida, et al., "Intelligent Reflecting Surface Placement Optimization in Air-Ground Communication Networks Toward 6G", Sep. 2020, 6 pages.

Jia, et al., "Machine Learning Empowered Beam Management for Intelligent Reflecting Surface Assisted MmWave Networks", Mar. 3, 2020, 8 pages.

Liu, et al., "Reconfigurable Intelligent Surfaces: Principles and Opportunities", Jul. 7, 2020, 60 pages.

Nadeem, et al., "Intelligent Reflecting Surface Assisted Wireless Communication: Modeling and Channel Estimation", Dec. 13, 2019, 7 pages.

Pan, et al., "Multicell MIMO Communications Relying on Intelligent Reflecting Surfaces", Apr. 24, 2020, 33 pages.

Wu, et al., "Intelligent Reflecting Surface Aided Wireless Communications: A Tutorial", IEEE Transactions on Communications, vol. 69, No. 5, Piscataway, NJ, USA, Jul. 7, 2020, 74 pages.

"International Preliminary Report on Patentability", Application No. PCT/US2021/048205, May 2, 2023, 12 pages.

"Foreign Office Action", CN Application No. 202180072587.5, Oct. 13, 2025, 17 pages.

Selinis, et al., "The Race to 5G Era; LTE and Wi-Fi", Oct. 25, 2018, 39 pages.

* cited by examiner

ADAPTIVE PHASE-CHANGING DEVICE SHARING AND HANDOVER

RELATED APPLICATION(S)

This application is a national stage entry of International Application No. PCT/US2021/048205, filed Aug. 30, 2021, which claims the benefit of U.S. Provisional Application No. 63/106,865, filed Oct. 28, 2020, the disclosures of which are incorporated herein by reference in their entirety.

BACKGROUND

Evolving wireless communication systems, such as fifth-generation (5G) technologies and sixth-generation (6G) technologies, use various techniques that increase data capacity relative to conventional wireless networks. As one example, 5G technologies transmit data using higher frequency ranges, such as the above-6 Gigahertz (GHz) band. As another example, the 5G technologies support multiple-input, multiple-output (MIMO) communications that use multiple transmission and/or reception paths. While these techniques can increase data capacity, transmitting and recovering information using these techniques also poses challenges. To illustrate, higher frequency signals and MIMO transmissions are more susceptible to multipath fading, which leads to recovery errors at a receiver. It therefore becomes desirable to correct for the signal distortions in order to obtain the performance benefits (e.g., increased data capacity) provided by these approaches.

SUMMARY

This document describes techniques and apparatuses for using adaptive phase-changing device sharing and handover. In aspects, a second base station shares an adaptive phase-changing device (APD) with a first base station. The second base station determines to use the APD in a communication path for a second wireless link with a second user equipment (UE). The second base station identifies a first base station using the APD, such as for a first wireless link with a first UE. Based on identifying the first base station using the APD, the second base station obtains apportioned access to the APD and configures a surface of the APD based on the apportioned access. The second base station uses the APD in the communication path for the second wireless link with the second UE using the APD and based on the apportioned access.

In aspects, a first base station shares an APD with a second base station. The first base station uses the APD in a communication path for a first wireless link with a first UE. The first base station then receives, from the second base station, a request to apportion access to the APD. The first base station coordinates with the second base station or the APD to obtain apportioned access to the APD. The first base station then uses the APD in the communication path for the first wireless link with the first UE based on the apportioned access.

In aspects, a source base station performs a handover of a UE to a target base station, where the source base station uses an APD in a communication path for a wireless link with the UE. The source base station maintains a wireless link with a UE using an APD. The source base station determines to perform a handover of the UE to a target base station and communicates an APD identifier of the APD to the target base station. The source base station then performs the handover of the UE to the target base station, where the handover may include providing the target base station with access to the APD.

In aspects, a target base station performs a handover of a UE that uses an APD in a communication path for a wireless link with a source base station. The target base station receives an APD identifier that identifies the APD used by the source base station to maintain the wireless link with the UE and coordinates with the source base station to determine one or more handover parameters for performing the handover of the UE. In aspects, the target base station determines a surface configuration for a surface of the APD and directs the APD to configure the surface of the APD using the surface configuration. The target base station then performs the handover of the UE and the APD.

The details of one or more implementations for adaptive phase-changing device sharing and handover are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for adaptive phase-changing device sharing and handover are described with reference to the following drawings. The same numbers are used throughout the drawings to reference like features and components.

DETAILED DESCRIPTION

Figure 1:
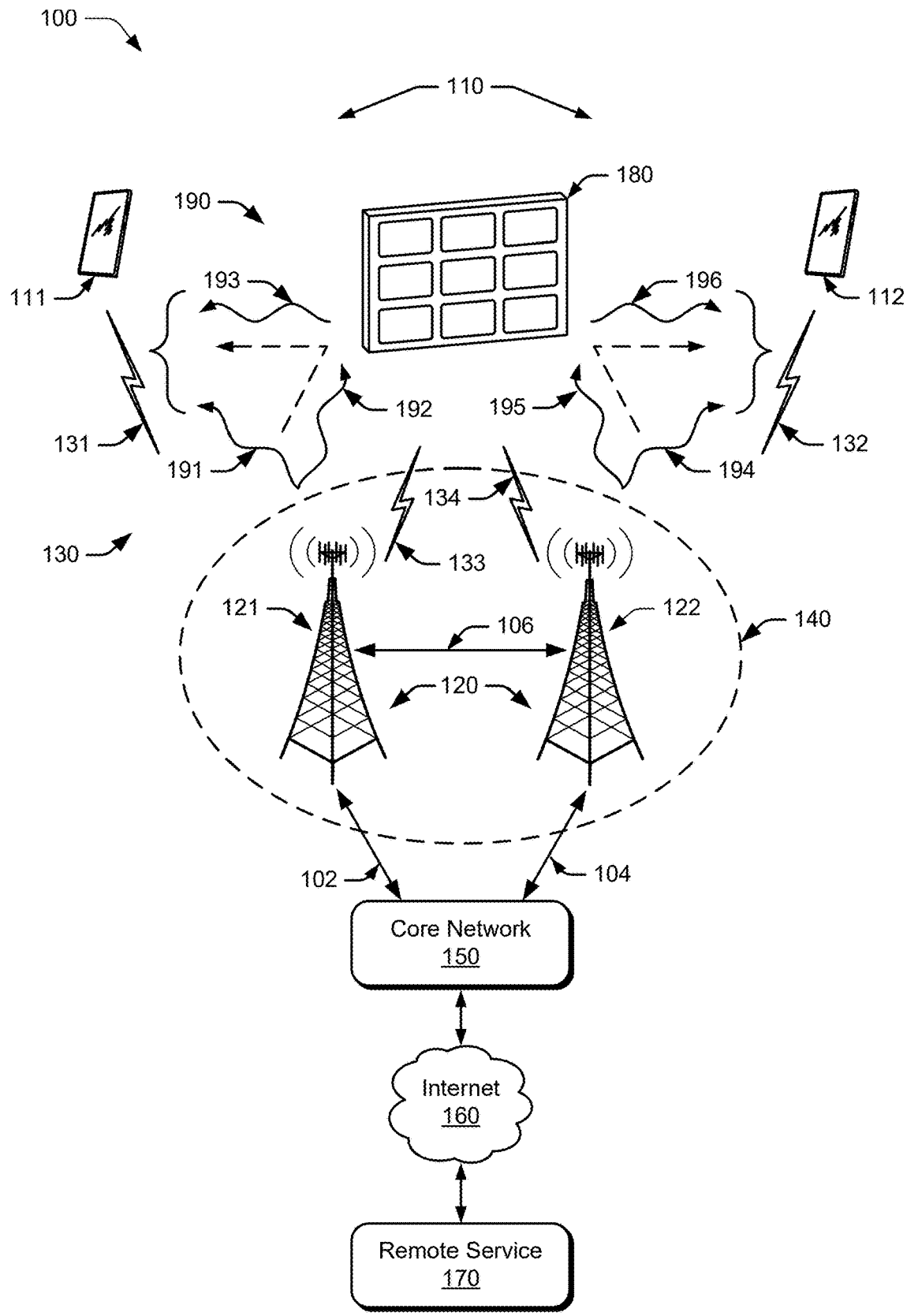
FIG. 1 illustrates an example operating environment in which various aspects of adaptive phase-changing device sharing and handover can be implemented.

Evolving wireless communication systems use various techniques to meet usage demands that strain or exceed the capabilities of preceding wireless communication systems. To illustrate, next-generation user devices implement applications that consume larger quantities of user data relative to preceding applications. To deliver these larger quantities of user data, evolving wireless communication systems (e.g., 5G, 6G) transmit at higher frequencies (e.g., millimeter wave range), sometimes with MIMO, to increase data capacity. While higher frequencies and MIMO communications provide higher data throughput, channel conditions can negatively impact these techniques. As an example, mmWave signals have high throughput under Line of Sight (LoS) conditions, but reflections create multi-path and frequency-selective fading that may increase recovery errors at the receiver.

Adaptive phase-changing devices (APDs) include a Reconfigurable Intelligent Surface (RIS) that, when properly configured, modifies propagating signals to correct for or reduce errors introduced by communication path(s), such as small scale fading and fading MIMO channels. Generally, an RIS includes configurable surface materials that shape how incident signals striking with the surface of the materials are transformed. To illustrate, the configuration of the surface materials can affect the phase, amplitude, and/or polarization of the transformed signal. Thus, modifying a surface configuration of the RIS changes how signals are transformed when they reflect off the RIS.

At times, multiple base stations may select a same APD to use when communicating with a user equipment (UE). To illustrate, assume a communication network that has a multiple-to-one deployment ratio of base stations-to-APDs (e.g., 2:1, 5:1, 10:1). Because the communication network includes more base stations than APDs, a first base station serving a first UE may identify and select a same APD to use as a second base station serving a second UE. As another example, multiple base stations coordinating communications to a single UE (e.g., dual-connectivity, carrier aggregation, joint transmission, joint reception) may select the same APD to communicate with the UE. In aspects of adaptive phase-changing device sharing and handover, the base stations apportion access to an APD, such as through time partitioning and/or configurable-surface-element partitioning. Generally, apportioning access to the APD corresponds to how and/or when the base stations utilize the RIS of the APD to exchange wireless signals with another device, such as utilizing and/or configuring the RIS to reflect signals. Using the APD improves a signal quality of communications exchanged between the base station(s) and the UE(s), which results in performance benefits (e.g., improved signal quality, increased data capacity). Sharing the APD among multiple base stations and/or UEs further improves communications exchanges in a communication network because the multiple base stations can access an APD, even when the communication network deploys fewer APDs than base stations. To illustrate, assume that a particular location in a radio access network (RAN) has limited space to mount an APD (e.g., only enough room for a single APD at the location). Sharing allows multiple base stations to benefit from a single APD and improve respective signal quality, which improves an overall performance of communications in the RAN.

While features and concepts of the described systems and methods for adaptive phase-changing device sharing and handover can be implemented in any number of different environments, systems, devices, and/or various configurations, various aspects of adaptive phase-changing device sharing and handover are described in the context of the following example devices, systems, and configurations.

Example Environment

FIG. 1 illustrates an example environment 100, which includes multiple user equipment 110 (UE 110), illustrated as UE 111 and UE 112. Each UE can communicate with base stations 120 (illustrated as base stations 121 and 122) through one or more wireless communication links 130 (wireless link 130), illustrated as wireless links 131 and 132. Alternatively or additionally, the wireless links 130 include wireless link 133 and wireless link 134 between at least one of the base stations 120 (e.g., base station 121) and an adaptive phase-changing device 180 (APD 180) to control a surface configuration of the APD 180. In the environment 100, the base station 121 communicates with the APD 180 using the wireless link 133, and the base station 122 communicates with the APD 180 using the wireless link 134. In other implementations, the base stations 120 include a wireline interface for communicating control information with the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the user equipment 110 using the wireless links 131 and 132, which may be implemented as any suitable type of wireless link. In one example, the base station 121 communicates with the UE 111 using the wireless link 131, and the base station 122 communicates with the UE 112 using the wireless link 132. The wireless links 131 and 132 include control-plane information and/or user-plane data, such as downlink user-plane data and control-plane information communicated from the base stations 120 to the user equipments 110, uplink of other user-plane data and control-plane information communicated from the user equipments 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., wireless link 131 and/or wireless link 132) utilize wireless signals, where an intermediate device (e.g., APD 180) reflects or transforms ray(s) 190 of the wireless signals, illustrated as signal ray 191, signal ray 192, signal ray 193, signal ray 194, signal ray 195, and signal ray 196. In aspects, the base station 121 and the base station 122 apportion access to the APD 180 to avoid contentions and/or collisions of the respective wireless signals, such as by apportioning access to the APD 180 using time-partitioning and/or configurable-surface-element partitioning as further described. For brevity, signal rays 191, 192, 193, 194, 195, and 196 that correspond to the respective wireless signals are described together, but they may be transmitted at different times and/or towards different portions of the APD 180 based on the apportioned access.

The signal ray 190 and signal ray 191 correspond to rays of a wireless signal used to implement the wireless link 131, while the signal ray 194 and signal ray 195 correspond to rays of a wireless signal to implement the wireless link 132. In the environment 100, the signal rays 190 and 191 correspond to rays of a downlink wireless signal from the base station 121 to the UE 111, and the signal rays 194 and 195 correspond to rays of a downlink wireless signal from the base station 122 to the UE 112, but the rays can alternatively or additionally correspond to an uplink wireless signal from the UE 111 or UE 112 (respectively) to the base station 121 or the base station 122. As part of communicating with the UE 111 through wireless link 131, and the UE 112 through the wireless link 132, the base station 121 beams a downlink wireless signal intended for the UE 111, and the base station 122 beams a downlink wireless signal intended for the UE 112. A first ray of each downlink wireless signal (e.g., the signal ray 191 and the signal ray 194) propagates toward the UE 111 and the UE 112, respectively, in a line-of-sight (LoS) manner, and a second ray of each downlink wireless signal (e.g., the signal ray 192 and the signal ray 195) propagates toward the APD 180. The signal ray 192 strikes the surface of the APD 180 and transforms into signal ray 193 that propagates toward the UE 111, while the signal ray 195 strikes the surface of the APD 180 and transforms into signal ray 196 that propagates toward the UE 112. In aspects, the signal ray 192 and the signal ray 195 strike the surface of an RIS of the APD 180, which steers the respective reflected signal rays (e.g., signal ray 193 and signal ray 196) toward the UE 111 and/or the UE 112. Note that the LoS signal ray 191 and the LoS signal ray 194 may be dynamically blocked or attenuated by foliage, vehicles, human bodies, water vapor, or other materials (not shown).

The base station 121 and the base station 122 can each configure an RIS of the APD 180 to direct how the RIS alters signal properties (e.g., direction, phase, amplitude, polarization) of a wireless signal. In aspects, the base station 121 and the base station 122 configure the RIS based on the apportioned access. For example, the base station 121 communicates a first RIS surface-configuration information to the APD 180 using the wireless link 133, which may include an adaptive phase-changing device slow-control channel (APD-slow-control channel) or an adaptive phase-changing device fast-control channel (APD-fast-control channel). In aspects, the first RIS surface-configuration information configures a subset of configurable surface elements and/or configures the surface for a first time-duration. Similarly, the base station 122 communicates a second RIS surface-configuration information to the APD 180 using the wireless link 134.

In various implementations of adaptive phase-changing device sharing and handover, the base station 121 and/or the base station 122 determines surface configuration(s) for the APD 180 to direct or steer reflections of wireless signals transmitted by the base stations 121 and 122 toward the UEs 111 and 112. Alternatively or additionally, the base station 121 and/or the base station 122 determine surface configuration(s) for the APD 180 based on downlink signal-quality measurements and/or parameters received from the UE 111 and/or the UE 112, uplink-quality measurements and/or parameters generated by the base station 121/base station 122, and/or link-quality measurements and/or parameters obtained from historical data records as further described. In some aspects, the base station 120 determines a second surface configuration using a first surface configuration received from another base station, such as when performing a handover as described with reference to FIG. 11.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160, to interact with a remote service 170.

Example Devices

Figure 2:
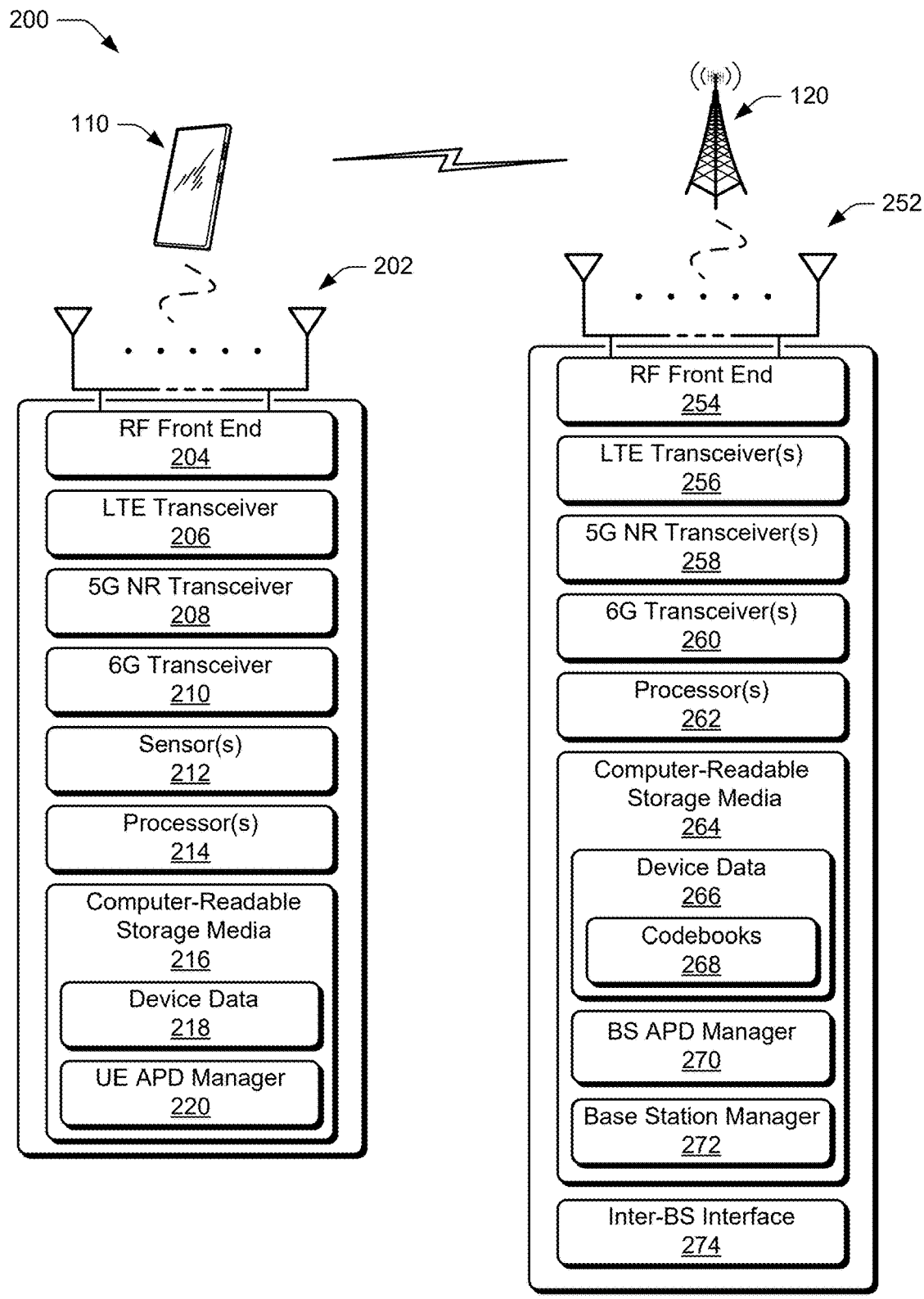
FIG. 2 illustrates an example device diagram of entities that can implement various aspects of adaptive phase-changing device sharing and handover.

FIG. 2 illustrates an example device diagram 200 of the user equipment 110 and base stations 120. Generally, the device diagram 200 describes network entities that can implement various aspects of adaptive phase-changing device sharing and handover. FIG. 2 shows respective instances of the UE 110 and the base station 120. The UEs 110 or the base station 120 may include additional functions and interfaces that are omitted from FIG. 2 for the sake of visual brevity. The UE 110 includes antennas 202, a radio frequency front end 204 (RF front end 204), and radio-frequency transceivers that include any one or more of an LTE transceiver 206, a 5G NR transceiver 208, and/or a 6G transceiver 210 for communicating with the base station 120 in the RAN 140. The RF front end 204 of the UE 110 can couple or connect the LTE transceiver 206, the 5G NR transceiver 208, and the 6G transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, the 5G NR transceiver 208, and/or the 6G transceiver 210 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above-6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 includes sensors 212 that can be implemented to detect various properties such as temperature, orientation, acceleration, proximity, magnetic fields, position, distance, supplied power, power usage, battery state, or the like. Accordingly, the sensors of the UE 110 may include any one or a combination of accelerometers, gyros, depth sensors, magnetometers, global navigation satellite system (GNSS) sensors (e.g., global positioning system (GPS) receiver), distance sensors, temperature sensors, thermistors, battery sensors, and power usage sensors.

The UE 110 also includes processor(s) 214 and computer-readable storage media 216 (CRM 216). The processor 214 may be a single-core processor or a multiple-core processor implemented with a homogenous or heterogeneous core structure. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes any combination of user data, multimedia data, codebook(s), applications, and/or an operating system of the UE 110. In implementations, the device data 218 stores processor-executable instructions that are executable by processor(s) 214 to enable user-plane communication, control-plane signaling, and user interaction with the UE 110.

The CRM 216 of the UE 110 may optionally include a user equipment adaptive phase-changing device manager 220 (UE APD manager 220). Alternatively or additionally, the UE APD manager 220 may be implemented in whole or part as hardware logic or circuitry integrated with or separate from other components of the UE 110. In aspects, the UE APD manager 220 of the UE 110 analyzes link-quality measurements, measurement reports, and/or other values and determines to request utilizing an APD in a communication path with a base station. Alternatively or additionally, the UE APD manager 220 determines to request a reconfiguration of a (RIS) surface of a current APD utilized in the communication path. The UE APD manager 220 then sends, to the base station 120, an indication to utilize and/or reconfigure an APD in the communication path.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and the 6G transceivers 260 to the antennas 252 to facilitate various types of wireless communication. The antennas 252 of the base station 120 may include an array of multiple antennas that are configured in a manner similar to or different from each other. The antennas 252 and the RF front end 254 can be tuned to, and/or be tunable to, one or more frequency bands defined by the 3GPP LTE and 5G NR communication standards and implemented by the LTE transceivers 256, the 5G NR transceivers 258, and/or the 6G transceivers 260. Additionally, the antennas 252, the RF front end 254, the LTE transceivers 256, the 5G NR transceivers 258, and/or the 6G transceivers 260 may be configured to support beamforming, such as Massive-MIMO, for the transmission and reception of communications with the UE 110.

The base station 120 also includes processor(s) 262 and computer-readable storage media 264 (CRM 264). The processor 262 may be a single-core processor or a multiple-core processor composed of a variety of materials, such as silicon, polysilicon, high-K dielectric, copper, and so on. CRM 264 may include any suitable memory or storage device such as RAM, SRAM, DRAM, NVRAM, ROM, or Flash memory useable to store device data 266 of the base stations 120. The device data 266 includes network-scheduling data, radio resource-management data, applications, and/or an operating system of the base stations 120, which are executable by processor(s) 262 to enable communication with the UE 110. The device data 266 also includes codebooks 268 and adaptive phase-changing device information 270 (APD information 270) for APDs 180 associated with the base station 120. The codebooks 268 may include any suitable type or combination of codebooks, including surface-configuration codebooks that store surface-configuration information for a RIS of an APD and beam-sweeping codebooks that store patterns, sequences, or timing information for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information. The APD information 270 includes any combination of information that describes and/or characterizes a particular APD, such as APD identifier information, APD location information and/or a current surface configuration.

In aspects, the CRM 264 of the base station 120 also includes a base station-adaptive phase-changing device manager 272 (BS APD manager 272) for managing APD usage in communication path(s) with the UE 110. Alternatively or additionally, the BS APD manager 272 may be implemented in whole or part as hardware logic or circuitry integrated with or separate from other components of the base station 120. In aspects, the BS APD manager 272 identifies APDs near the UE 110 and determines when to utilize the APD(s) in the communication path. The BS APD manager 272 also determines surface configurations for the APD (e.g., RIS configurations), such as initial surface configurations and/or surface reconfigurations based on link-quality measurements, measurement reports, and/or other values as further described. In some implementations, the BS APD manager 272 receives an indication from the UE 110 to utilize an APD in the communication path and/or to perform a surface reconfiguration of the existing APD utilized in the communication path. In aspects, the BS APD manager 272 communicates with another BS APD manager 272 at another base station to apportion access (e.g., access to configure the RIS, access to utilize the surface for transmissions) to a single APD between the base station.

The CRM 264 also includes a base station manager 274 for managing various functionalities and communication interfaces of the base stations 120. Alternatively or additionally, the base station manager 274 may be implemented in whole or part as hardware logic or circuitry integrated with or separate from other components of the base stations 120. In at least some aspects, the base station manager 274 configures the antennas 252, RF front end 254, LTE transceivers 256, 5G NR transceivers 258, and 6G transceivers 260 for communication with the UE 110, the APD 180, and/or communication with a core network. The base station 120 includes an inter-base-station interface 276 (inter-BS interface 276), such as an Xn and/or X2 interface, which the base station manager 274 configures to exchange user-plane and control-plane data between another base station 120, to manage the communication of the base stations 120 with the UE 110. The base station 120 also includes a core network interface (not shown) that the base station manager 274 configures to exchange user-plane data and control-plane information with core network functions and/or entities.

Figure 3:
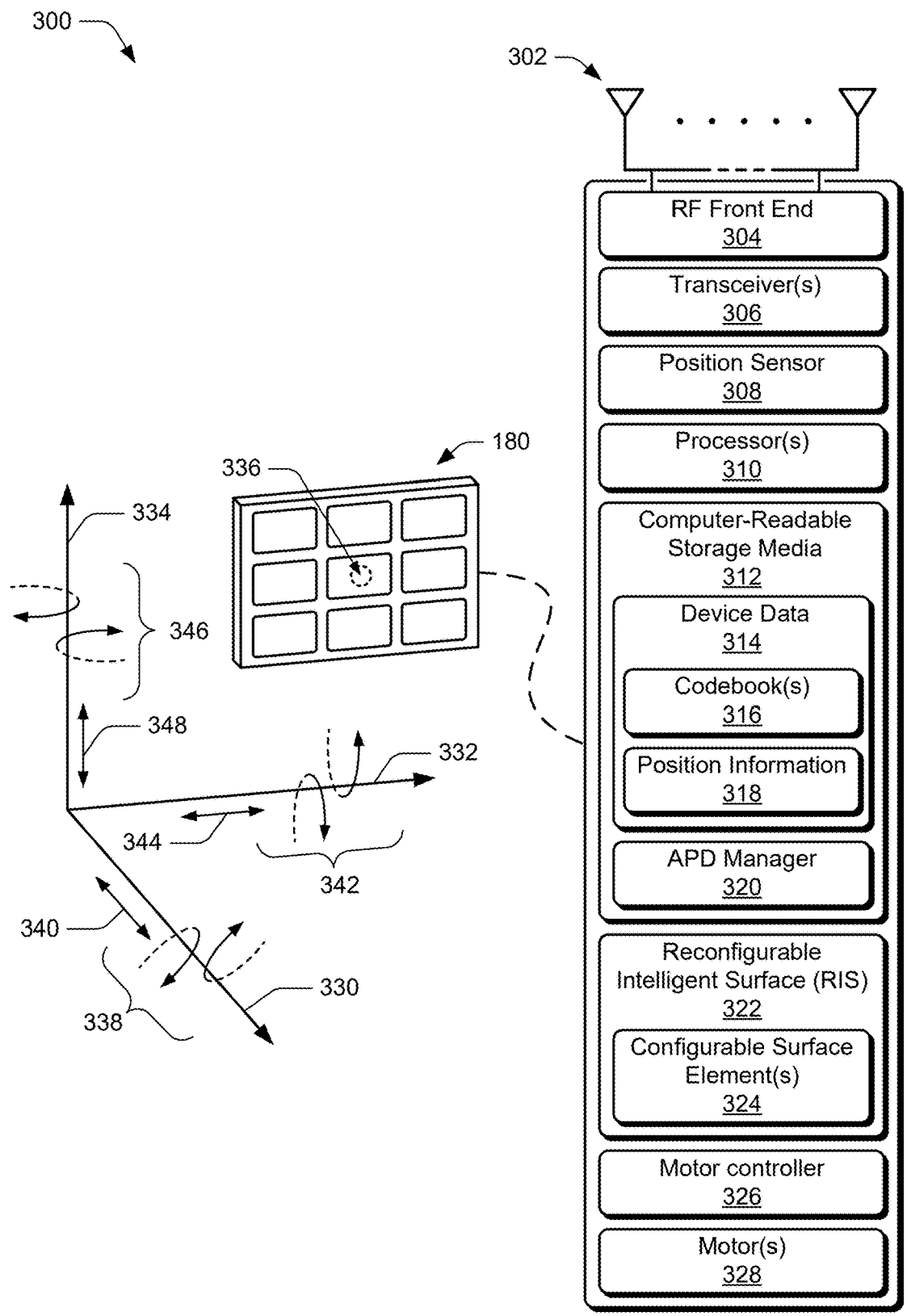
FIG. 3 illustrates an example device diagram of an adaptive phase-changing device that can be used in accordance with one or more aspects of adaptive phase-changing device sharing and handover.

FIG. 3 illustrates an example device diagram 300 of the APD 180. Generally, the device diagram 300 describes an example entity with which various aspects of adaptive phase-changing device sharing and handover can be implemented but may include additional functions and interfaces that are omitted from FIG. 3 for the sake of visual clarity. The adaptive phase-changing device (APD) 180 is an apparatus that includes a Reconfigurable Intelligent Surface (RIS) 322, and components for controlling the RIS 322 (e.g., by modifying the surface configuration of the RIS), as further described below. In some implementations, the APD 180 may also include components for modifying the position of the APD 180 itself, which in turn modifies the position of the RIS 322. The APD 180 includes one or more antenna(s) 302, a radio frequency front end 304 (RF front end 304), and one or more radio-frequency transceivers 306 for wirelessly communicating with the base station 120 and/or the UE 110. The APD 180 can also include a position sensor, such as a GNSS module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above-6 GHz bands. Thus, the antenna 302, the RF front end 304, and the transceiver(s) 306 provide the APD 180 with an ability to receive and/or transmit communications with the base station 120, such as information transmitted using APD-control channels (e.g., an APD-slow-control channel or APD-fast-control channel) as further described.

The APD 180 includes processor(s) 310 and computer-readable storage media 312 (CRM 312). The processor 310 may be a single-core processor or a multiple-core processor implemented with a homogenous or heterogeneous core-structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination, and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120, by way of a BS APD manager 272, can use the position information 318 in computing angular or distance information, such as between the base station 120 and APD 180 and/or between the APD 180 and a UE 110 of interest. The codebooks 316 can include surface-configuration codebooks that store surface-configuration information for a RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects of adaptive phase-changing device sharing and handover, the CRM 312 of the APD 180 includes an adaptive phase-changing device manager 320 (APD manager 320). Alternatively or additionally, the APD manager 320 may be implemented in whole or part as hardware logic or circuitry integrated with or separate from other components of the APD 180. Generally, the APD manager 320 manages a surface configuration of the APD 180, such as by processing information exchanged with a base station over wireless link(s) 133 and/or 134 and using the information to configure a reconfigurable intelligent surface 322 (RIS 322) of the APD 180. To illustrate, the APD manager 320 receives an indication of a surface configuration over the wireless links 133 (an APD control channel), extracts the surface configuration from the codebooks 316 using the indication, and applies the surface configuration to the RIS 322. Alternatively or additionally, the APD manager 320 initiates the transmission of uplink messages to the base station over the wireless links 133, such as acknowledgments/negative acknowledgments (ACKs/NACKs) for various APD configurations or management commands. In some aspects, the APD manager 320 receives an indication of a beam-sweeping pattern (e.g., beam-sweeping pattern index) over the wireless links 133 and applies a sequence of various surface configurations to the RIS based on the beam-sweeping pattern and/or in accordance with a synchronization or pattern timing indicated by or received with the indication.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft-rotation rate of a stepper motor in revolutions-per-minute (RPM), a linear movement of a linear motor millimeters (mm), a linear velocity of a linear motor in meters/second (m/s). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of adaptive phase-changing device sharing and handover, a base station 120 may reposition or reorient one or more APDs 180 to improve or enable wireless signal reflections to be directed to the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth™ Zigbee, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 3, a position of the APD 180 may be defined with respect to a three dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Controlling Adaptive Phase-Changing Devices

Figure 4:
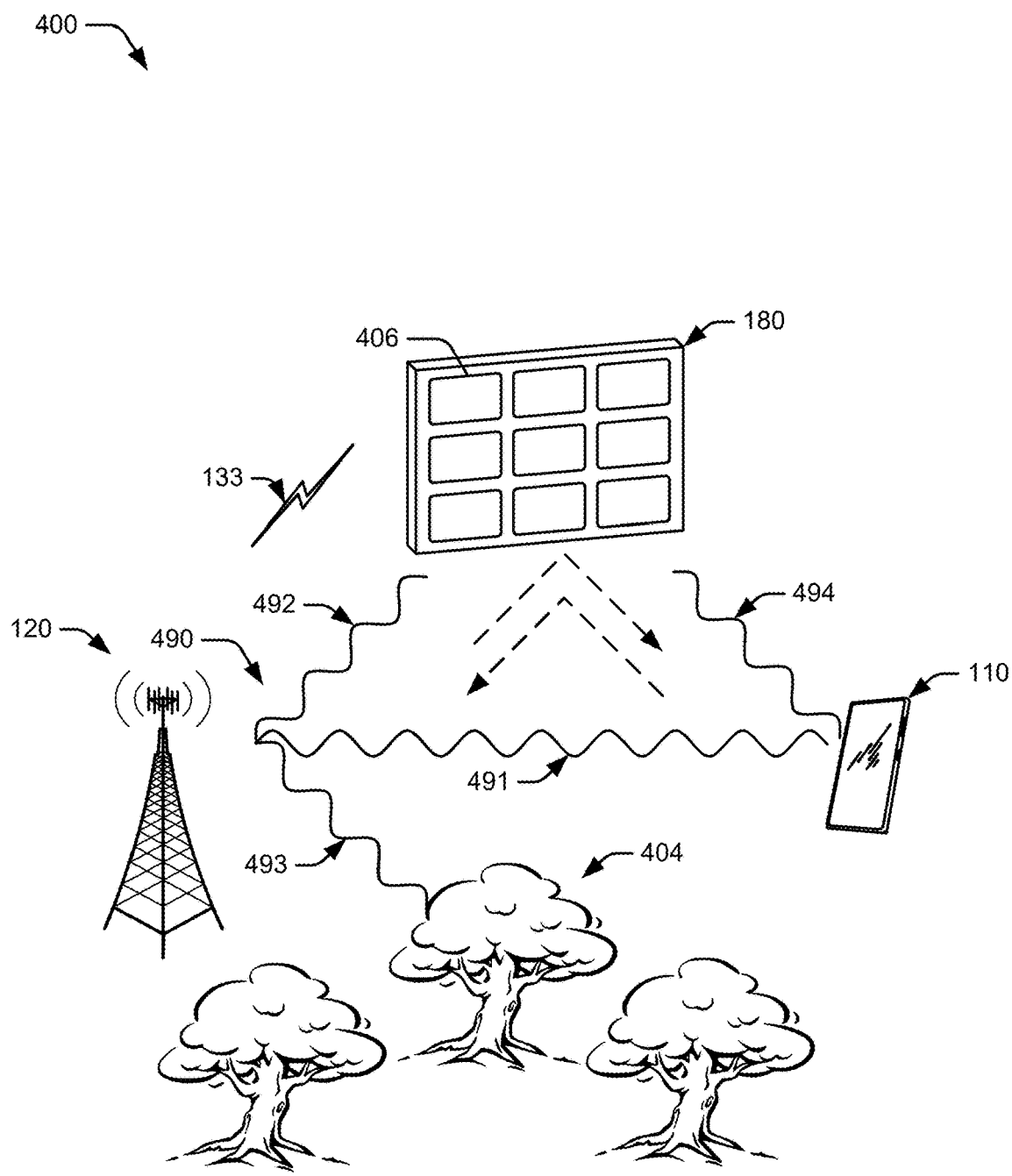
FIG. 4 illustrates an example environment in which a base station uses an adaptive phase-changing device to communicate with a user equipment in accordance with various aspects of adaptive phase-changing device sharing and handover.

FIG. 4 illustrates an example environment 400 that implements various aspects of adaptive phase-changing device sharing and handover. The environment 400 includes the base station 120, the UE 110, and the APD 180 of FIG. 1. The base station 120 communicates with the UE 110 over the wireless link 131 (not illustrated) by transmitting a downlink wireless signal 490 that covers a spatial region. Alternatively or additionally, the UE 110 communicates with the base station 120 by transmitting an uplink wireless signal over the wireless link 131 or another wireless connection with the base station 120 (e.g., a low-frequency anchor connection below 6 GHz).

The wireless signal 490 includes a first signal ray 491 that propagates towards the UE 110 in a LoS manner, a second signal ray 492 that propagates towards the APD 180, and a third signal ray 493 that propagates towards an obstruction 404 (illustrated as foliage) that blocks the signal ray 493 from reaching the UE 110. Alternatively or additionally, the UE 110 communicates with the base station 120 over the wireless link 131 by transmitting an uplink wireless signal. In aspects, the base station 120 transmits wireless signals to the APDs 180 in a high-frequency band that is at or above 6 GHz, such that signal rays 491, 492, and/or 493 may be blocked by obstructions (e.g., temporary LoS obstructions of signal ray 491, not shown). Individual signal rays 491, 492, and 493 of the wireless signal 490 may be transmitted simultaneously or at different times.

In various implementations, the APD 180 (or other APDs) participate in the uplink, downlink, and/or position-determining related communications (e.g., reference signals) between the base station 120 and the UE 110 by transforming (e.g., reflecting) waveforms using an RIS of the APD 180 with a surface configuration determined by the base station 120. To illustrate, the signal ray 492 strikes the surface of the APD 180, shown with a reconfigurable intelligent surface 406 (RIS 406), and transforms into the signal ray 494, which is directed toward the UE 110. As part of receiving the wireless signal 490, the UE 110 may receive the signal ray 491 and the signal ray 494 (but not the signal ray 493).

In implementations, the base station 120 configures the RIS 406 to direct how the signal ray 492 transforms into the signal ray 494 and reflects from the APD 180 for downlink communications. Alternatively or additionally, for uplink communications, the base station 120 directs how the RIS 406 transforms an incident signal ray from the UE 110 on a path reciprocal to signal ray 494 into another signal ray that follows a path reciprocal to that of signal ray 492 to the base station 120. For example, the base station 120 analyzes link-quality measurements, measurement reports, and/or other values (e.g., downlink-quality measurements, uplink-quality measurements, historical link-quality measurements) to identify channel impairments. By way of example and not of limitation, various link-quality measurements that do not meet an acceptable performance level can indicate channel impairments, such as by a delay spread between a first received signal and a last received signal (e.g., received multipath rays) exceeding an acceptable delay spread threshold or by an average time-delay (of the multipath rays) exceeding an acceptable average time-delay threshold. As another example, the link-quality measurements can be used to obtain an estimated UE location. The base station 120 then uses the estimated UE location to access historical data records that indicate a history of channel impairment(s) at the estimated UE location. In response to identifying the channel impairments, the base station 120 selects a surface configuration for the RIS 406 that transforms at least a portion of a first wireless signal (e.g., signal ray 492) into a second wireless signal (e.g., signal ray 494) to mitigate the channel impairments by improving a received signal quality.

In aspects, the base station 120 selects the surface configuration from a surface-configuration codebook. As one example, the base station 120 analyzes the codebook to identify a surface configuration that modifies and/or transforms various signal characteristics of a wireless signal, such as modifying one or more desired phase characteristic(s), one or more amplitude characteristic(s), a polarization characteristic, and so forth. In some implementations, the base station 120 uses historical data records to select a surface configuration. For instance, the base station obtains an estimated UE location using information indicated by the link-quality measurements, measurement reports, and/or other values, and accesses historical data records using the estimated UE location, where the historical data records include surface configurations that result in acceptable performance levels at the estimated UE location.

In various implementations, the base station 120 communicates surface-configuration information to the APD 180 over the wireless link 133. As one example, the wireless link 133 operates as an adaptive phase-changing device slow-control channel (APD-slow-control channel), where the base station transmits messages that indicate a surface configuration to the APD 180, similar to layer 2 or layer 3 control messages that communicate information using information elements (IEs). Alternatively or additionally, the wireless link 133 includes an adaptive phase-changing device fast-control channel (APD-fast-control channel), where the base station indicates control information using signaling, sometimes on a slot-by-slot basis, for quick surface-configuration changes (e.g., surface configurations applied on a slot-by-slot basis). As one example, the base station 120 transmits an index into a surface-configuration codebook to indicate a phase vector as the surface configuration using the APD-slow-control channel or the APD-fast-control channel.

Figure 5:
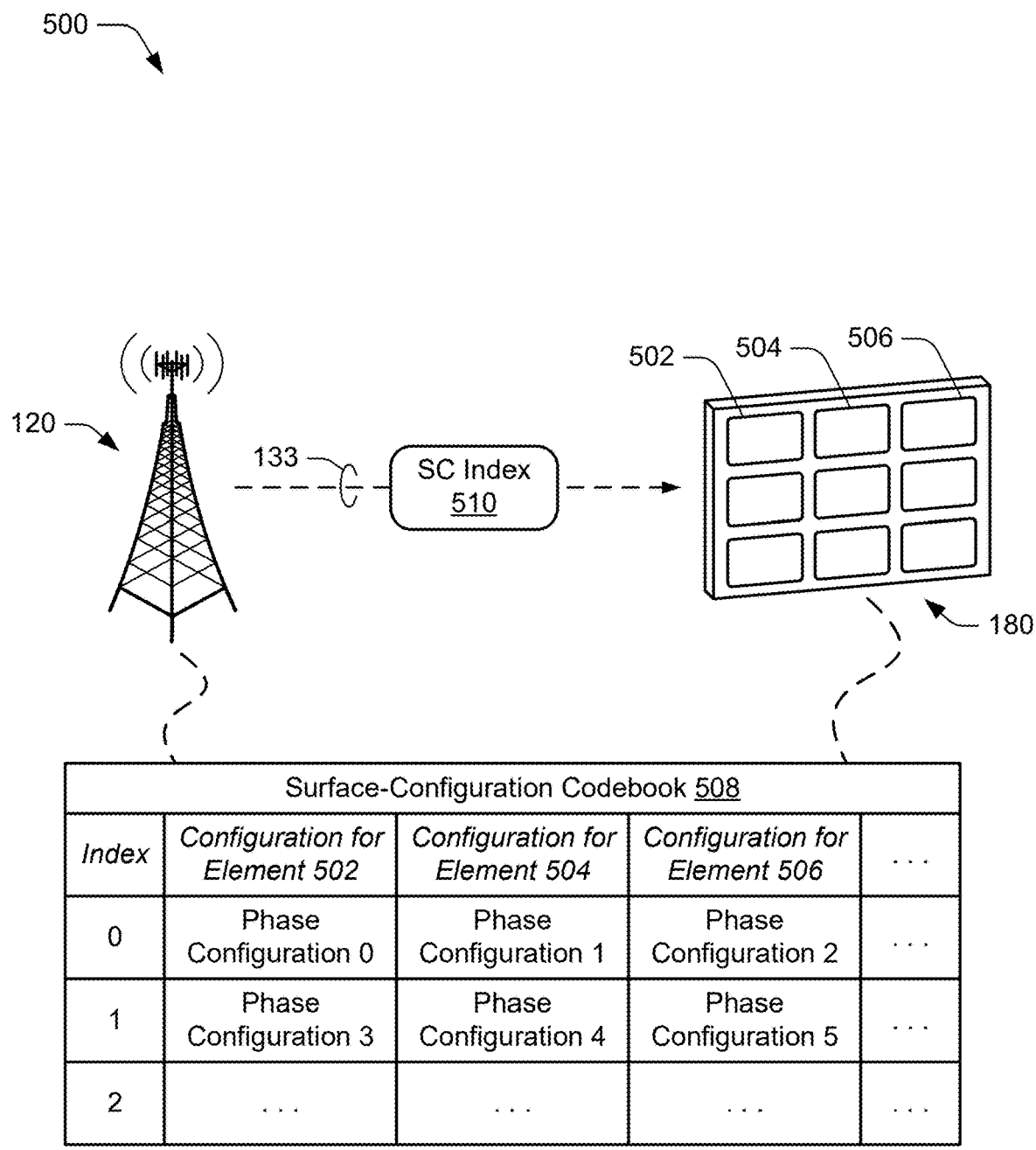
FIG. 5 illustrates an example environment in which a base station configures an adaptive phase-changing device in accordance with various aspects of adaptive phase-changing device sharing and handover.

By way of example, consider FIG. 5, which illustrates an example 500 of configuring an APD 180 in accordance with one or more aspects. The example 500 includes instances of a base station 120 and an APD 180, which may be implemented similarly as described with reference to FIGS. 1 through 4. The RIS implemented by the APD 180 includes an array of "N" configurable surface elements, such as configurable surface element 502, configurable surface element 504, configurable surface element 506, and so forth, where "N" represents the number of configurable surface elements of the RIS.

In implementations, the base station 120 manages a configuration of the RIS of the APD 180 through use of a surface-configuration codebook 508, which can be preconfigured and/or known by both the base station 120 and the APD 180. Alternatively or additionally, the base station 120 may also manage a time-varying configuration of the RIS of the APD 180 through use of a beam-sweeping codebook. In some cases, the base station 120 transmits a surface-configuration codebook 508 and/or a beam-sweeping codebook using the wireless link 133, such as over an APD-slow-control channel using one or more messages. In aspects, the base station 120 uses the APD-slow-control channel to communicate large quantities of data, to communicate data without low-latency requirements, and/or to communicate data without timing requirements. At times, the base station 120 transmits multiple surface-configuration codebooks to the APD 180, such as a first surface-configuration codebook for downlink communications, a second surface-configuration codebook for uplink communications, a phase-vector codebook, a beam-sweeping codebook, or the like. In response, the APD 180 stores the surface-configuration codebook(s) 508 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 508 and other codebooks in the CRM 312 of the APD 180 during assembly, installation, calibration, verification, or through an operator manually adding or updating the codebook(s).

The surface-configuration codebook 508 includes configuration information that specifies a surface configuration for some or all of the configurable surface elements (e.g., elements 324) forming the RIS of the APD 180. As one example, each index of the code book corresponds to a phase vector with configuration information for each configurable surface element of the APD 180. Index 0, for instance, maps phase configuration 0 to configurable surface element 502, phase configuration 1 to configurable surface element 504, phase configuration 2 to configurable surface element 506, and so forth. Similarly, index 1 maps phase configuration 3 to configurable surface element 502, phase configuration 4 to configurable surface element 504, phase configuration 5 to configurable surface element 506, and so forth. The surface-configuration codebook 508 can include any number of phase vectors that specify configurations for any number of configurable surface elements such that a first phase vector corresponds to a first surface-configuration for the APD 180 (by way of configurations for each configurable surface element in the RIS), a second phase-vector corresponds to a second surface configuration for the APD 180, etc. In aspects, one or more surface configurations or phase vectors may be mapped or calibrated to specific angle information of incident and/or reflective wireless signals (e.g., reference signals), signal rays, beamformed transmission of the base station 120, or the like.

While the surface-configuration codebook 508 of FIG. 5 includes phase vector information, alternative or additional codebooks store beam configuration information, such as a first surface configuration that specifies a first beam with a first (propagation) direction, a second surface configuration that specifies a second beam with a second direction, etc. Thus, in various implementations, the surface-configuration codebook 508 corresponds to a beam-codebook, which may enable the APD 180 to implement beamforming of incident wireless signals. Similarly, to configure the surface of the APD 180, the base station determines the desired beam configuration for the transformed signal and identifies an entry in the beam-codebook corresponding to the desired beam configuration. In some aspects, a beam-sweeping codebook indicates a pattern of surface configurations and/or beam configurations, such as surface configurations and/or beam configurations, as indicated by the surface-configuration codebook 508 and beam configurations specified by the beam-codebook. To illustrate, the beam-sweeping codebook indicates an order of surface configurations and optionally APD reflection identifiers to cycle through in order to beam sweep in a horizontal direction or vertical direction. Alternatively or additionally, the beam-sweeping codebook indicates a time duration for applying each surface configuration effective to steer a reflected beam in a specific direction for the duration of time.

The surface-configuration information stored in a codebook can correspond to a full configuration that specifies an exact configuration (e.g., configure with this value) or a delta configuration that specifies a relative configuration (e.g., modify a current state by this value). In one or more implementations, the phase configuration information specifies a directional increment and/or angular adjustment between an incident signal and a transformed signal. For instance, the phase configuration 0 can specify an angular adjustment configuration for element 502 such that the configurable surface element 502 reflects the incident waveform with a "phase configuration 0" relative angular or directional shift. As shown in FIG. 5, the base station 120 communicates an indication to the APD 180 that specifies a surface configuration. In the present example, the indication specifies a surface-configuration index 510 (SC index 510) that maps to a corresponding surface configuration of the APD 180. In response to receiving the indication, the APD manager 320 retrieves the surface configuration from the surface-configuration codebook 508 using the index and applies the surface configuration to the RIS. For example, the APD manager 320 configures each configurable surface element as specified by a respective entry in the surface-configuration codebook 508.

In various implementations, the base station 120 communicates timing information (not shown) to the APD 180, which may be included with a surface configuration or beam-sweeping index. For instance, the base station 120 sometimes indicates, to the APD 180 and using the wireless link 133, a start time for the application of an indicated surface configuration or beam-sweeping pattern. In aspects, the base station 120 communicates a stop time that indicates when to remove and/or change the surface configuration or beam-sweeping pattern. In changing the surface configuration, the APD 180, by way of the APD manager 320, can apply a default surface configuration, return to a previous surface configuration (e.g., a surface configuration used prior to the indicated surface configuration), and/or apply a new surface configuration to control a direction in which the APD 180 reflects wireless signals. To maintain synchronized timing with the base station 120, the APD 180 receives and/or processes a base station synchronizing signal.

By specifying the timing information, the base station 120 can synchronize and/or configure the APD 180 to a particular UE (e.g., UE 110). For example, the base station 120 configures the APD 180 for the particular UE by specifying start and stop times that correspond to a time slot assigned to the particular UE. In aspects, the base station 120 transmits surface-configuration indications and/or timing information using an APD-fast-control channel, which allows the base station 120 to dynamically configure the APD 180 on a slot-by-slot basis. For example, the base station 120 transmits a surface-configuration schedule to the APD that indicates when to apply different surface configurations to the RIS/configurable surface elements. Alternatively or additionally, the base station 120 communicates surface configuration changes on a slot-by-slot basis using signaling on the APD fast-control channel. These allow the base station to configure the APD for multiple UEs, such as in scenarios where at least two base stations share the APD to communicate with different UEs, and improve data rates, spectral efficiency, data throughput, and reliability for the multiple UEs and the corresponding wireless network.

APD Sharing and Handover

A first wireless device can use an APD to direct or steer a reflection of a wireless signal toward a second wireless device of interest and improve a signal quality of the wireless signal relative to transmissions that exclude the APD. At times, multiple base stations may select a same APD to use when communicating with one or more UEs, such as when operating in a RAN that has a multiple-to-one deployment ratio of base stations-to-APDs or when coordinating communications to a single UE (e.g., dual-connectivity, carrier aggregation, joint transmission, joint reception). In aspects, the multiple base stations communicate with one another to coordinate and/or apportion access to a single APD.

Figure 6:
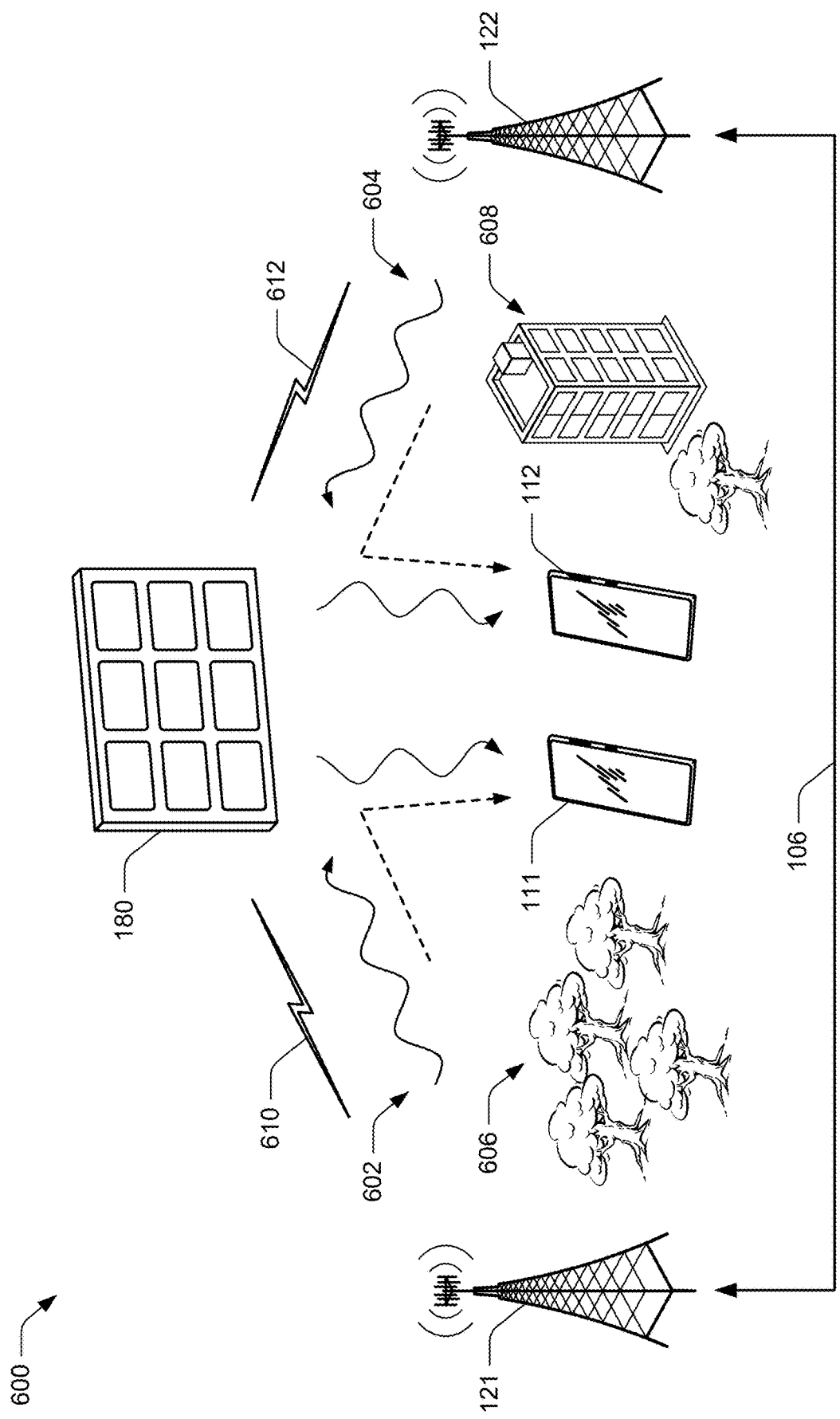
FIG. 6 illustrates an example environment that implements various aspects of adaptive phase-changing device sharing and handover.

FIG. 6 illustrates an example environment 600 that implements various aspects of adaptive phase-changing device sharing and handover. The environment 600 includes the base station 121, the base station 122, the UE 111, the UE 112, and the APD 180 of FIG. 1, where the base station 121 and the base station 122 share the APD 180. The base station 121 maintains a first wireless link by transmitting and/or receiving wireless signals 602 to/from a first UE 111, while the base station 122 maintains a second wireless link by transmitting and/or receiving wireless signals 604 to/from a second UE 112. However, in alternate aspects, the base station 121 and the base station 122 coordinate communications with a same UE (not illustrated), such as through dual-connectivity, carrier aggregation, joint transmission, joint reception, and so forth.

In the environment 600, the base station 121 identifies at least one signal or link-quality measurement, a measurement report, and/or other values indicative of a channel impairment, such as an impairment caused by an obstruction 606 that blocks, attenuates, and/or distorts wireless transmissions between the base station 121 and the UE 111. To illustrate, a base station and UE frequently provide one another with measurement reports or other feedback on received signals through various link-quality measurements and/or measurement reports, such as a received signal strength indicator (RSSI), power information, signal-to-interference-plus-noise ratio (SINR) information, reference signal receive power (RSRP), channel quality indicator (CQI) information, channel state information (CSI), Doppler feedback, BLock Error Rate (BLER), Quality of Service (QoS), Hybrid Automatic Repeat reQuest (HARQ) information (e.g., first transmission error rate, second transmission error rate, maximum retransmissions), uplink SINR, timing measurements, error metrics, and so on. This can include the base station 121 generating uplink-quality measurements based on uplink wireless signals received from the UE 111 and/or receiving downlink-quality measurements and/or measurement reports from the UE 111. The base station 121 monitors the signal and/or link-quality measurements and/or measurement reports to identify when channel impairments occur, such as by identifying when a received signal level drops below a threshold value as the UE 111 moves to a first location where the obstruction 606 blocks, attenuates, and/or distorts signals between the base station 121 and UE 111. In a similar manner, the base station 122 monitors signal and/or link quality measurements, measurement reports, and/or other values to identify when channel impairments occur between the base station 122 and the UE 112, such as when the UE 112 moves to a second location where obstruction 608 blocks, attenuates, and/or distorts signals between the base station 122 and UE 112.

In response to identifying a channel impairment, the base station 121 determines to utilize the APD 180 in communications with the UE 111. To illustrate, the base station 121 obtains an estimated location of the UE 111, such as by using GNSS-based location information and/or the UE 111 communicating an estimated location to the base station 121 using low-band signaling, and selects the APD 180 based on the estimated UE location. In aspects, the base station 121 queries a server for APDs within a threshold distance of the estimated UE location, for example, a server included in the core network 150 of FIG. 1. Alternatively or additionally, the base station 121 queries the core network for candidate APDs within a cell service area of the base station. In some aspects, the base station sends a request to the candidate APDs using a (downlink) APD-slow-control channel for APD capabilities (e.g., a number of configurable surface elements, a configuration bit-resolution for the configurable surface elements, supported APD codebooks) using control message(s) and/or IEs included in the control message(s) and selects the APD 180 based upon APD capabilities. To illustrate, the base station 121 queries the candidate APDs to identify which APDs support configurable-surface-element partitioning (e.g., apportioning a first subset of configurable surface elements to a first base station and a second subset of configurable surface elements to a second base station) for concurrent operation of reflecting multiple signals from multiple devices. In some aspects, the base station 121 analyzes historical records using the estimated UE location to identify the APD 180 as being within a threshold distance to the UE 111 and/or as having APD capabilities that are compatible with the base station 121 (e.g., common codebooks, supports concurrent operation of reflecting multiple signals from multiple devices using configurable-surface-element partitioning). In aspects, the historical records include a surface configuration suitable for the estimated UE location.

The base station 121 communicates with the APD 180 using a first APD-control channel 610 that generally represents an APD-slow-control channel and/or APD-fast-control channel. In some aspects, the base station 121 queries the APD 180 using the APD-control channel 610 to determine whether the APD is in an unengaged state (e.g., not being used by any other device) or whether the APD is in an engaged state (e.g., being used by another device). In aspects where the APD 180 supports multiple APD-control channels, the base station 121 uses a base station-specific APD-control channel, while in other aspects, the base station 121 shares the APD-control channel with other base stations, and each base station (optionally) includes a base station identifier in transmissions to the APD. The base station 122, for example, concurrently communicates with the APD 180 using a second APD-control channel 612 that generally represents an APD-slow-control channel and/or APD-fast-control channel. The second APD-control channel 612 can correspond to a separate and distinct base station-specific APD-control channel (e.g., separate from the APD-control channel 610) and/or can correspond to an APD-control channel shared between the base station 121 and the base station 122 as further described.

In some aspects, the base station 121 queries the base station 122 to determine whether the base station 122 currently uses the APD 180 in a communication path for a communication link with a UE (e.g., UE 112). For example, the base station 121 identifies base stations within an operating range of the APD 180, such as by querying the core network 150, and identifies the base station 122 as being within an operating range of the APD 180. In aspects, the base station 121 queries the base station 122 using an inter-base station interface 106 to (a) determine whether the base station 122 is using the APD 180 and (b) negotiate and/or coordinate apportioned access to the APD 180 (e.g., apportion configurable surface elements, apportion time durations for access) as further described with reference to FIG. 7.

The base station 121 selects a first surface configuration for the APD 180, such as by analyzing a codebook using an estimated UE location, signal and/or link measurements, and/or the apportioned access. Similarly, the base station 122 determines a second surface configuration for the APD 180 using signal quality measurements, link-quality measurements, an estimated UE location of the UE 112, the apportioned access to the APD 180, and so forth. To illustrate, assume the base station 121 and the base station 122 apportion access to the APD 180 using time partitioning such that the base station 121 transmits signals towards (and/or receives signals from) the surface of the APD 180 during a first time-duration and the base station 122 transmits signals towards (and/or receives signals from) the surface of the APD 180 during a second time-duration that does not overlap with the first time-duration (e.g., the base stations time-share the APD 180). In aspects, the base station 121 selects the first surface configuration for the configurable surface elements of the RIS during the first time-duration. In other words, the first surface configuration can include timing information that directs the APD 180 when to apply the surface configuration and/or a time duration for applying the surface configuration. Alternatively or additionally, the base station 121 controls when the APD 180 applies and removes the first surface configuration, such as by transmitting commands over the APD-control channel 610 that indicate when to apply and remove the first surface configuration. Similarly, the base station 122 controls when the APD 180 applies and removes the second surface configuration, such as by transmitting commands over the APD-control channel 612 that indicate when to apply and remove the second surface configuration.

In some aspects, the base station 121 and the base station 122 apportion access to the APD 180 using configurable-surface-element partitioning such that the base station 121 transmits signals towards (and/or receives signals from) a first subset of configurable surface elements of the APD 180 and the base station 122 transmits signals towards (and/or receives signals from) a second subset of configurable surface elements of the APD 180. The configurable surface elements of the APD 180 can be partitioned in any suitable manner, such as through horizontal partitioning that groups elements in a same horizontal row, vertical partitioning that groups elements in a same vertical column, quadrant partitioning, and so forth.

In alternative or additional aspects, a base station requests an APD-access allocation (e.g., a time-duration, a subset of configurable surface elements) from the APD 180 using an APD-control channel 610, 612, and the APD manager 320 of the APD 180 assigns and communicates the APD-access allocation to the appropriate requesting base station. For example, the APD manager 320 regulates access to the APD 180 by monitoring queries from one or more base stations, apportioning access to the APD (e.g., the APD-access allocation) based on availability to the base stations, and/or communicating respective APD-access allocations to each base station. To illustrate, the APD manager 320 apportions access to the APD 180 (based on availability) using time partitioning and/or configurable-surface-element partitioning.

In aspects, the APD 180 supports multiple APD-control channels, such as multiple APD-slow-control channels and/or multiple APD-fast-control channels such that the base station 121 communicates the first surface configuration to the APD 180 using the first APD-slow-control channel 610 and the base station 122 communicates the second surface configuration to the APD 180 using the second APD-slow-control 612. Alternatively or additionally, the base station 121 and the base station 122 communicate to the APD 180 using a same APD-control channel (not illustrated), such as by coordinating access to the APD-control channel with each other through the interface 106, apportioning a first resource block of the APD-control-channel to the base station 121, and apportioning a second resource block of the APD-control-channel to the base station 122.

In alternative aspects, the base station 122 communicates the second surface configuration to the base station 121 through the interface 106, and the base station 121 uses the APD-control channel 610 to communicate both a first surface configuration (determined by the base station 121) and a second surface configuration (determined by the base station 122) to the APD 180, such as that described with reference to FIG. 9. This can include the base station 121 transmitting control information over the APD-control channel 610 to the APD 180 that indicates when to apply the first surface configuration, when to remove the first surface configuration, when to apply the second surface configuration, when to remove the second surface configuration, and so forth. In other words, the base station 121 communicates timing information to the APD 180 for both the base station 121 and the base station 122.

In aspects, a source base station using an APD to communicate with a UE sometimes communicates APD information (e.g., APD identifier, APD location information, surface configuration) to a target base station when performing a handover. To illustrate, assume the base station 121 determines to perform a handover of the UE 111 to the base station 122. In some aspects, and as described with reference to FIG. 11, the (source) base station 121 communicates an APD identifier and/or a surface configuration to the (target) base station 122 through the interface 106. The (target) base station 122 analyzes the APD information to (a) determine whether to use the identified APD when exchanging wireless signals with the UE participating in the handover and/or (b) a surface configuration for the identified APD. For example, the (target) base station 122 uses the surface configuration, estimated UE location information, location information of the (source) base station 121, and or location information of the (target) base station 122 to calculate and/or determine a modified surface configuration that configures a surface of the APD to reflect a signal originating from the target base station towards the UE 110. Alternatively, or additionally, the target base station selects a modified surface configuration based on signal and/or link-quality measurements, measurement reports, and/or other values from the UE 111.

Using an APD to direct, steer, and/or transform signals improves a signal quality of communications exchanged between a base station and a UE and results in performance benefits (e.g., improved signal quality, increased data capacity). Sharing the APD between multiple base stations and/or UEs further improves communications exchanged in a communication network by providing multiple base stations with access to an APD even when the communication network deploys fewer APDs than base stations because sharing provides each base station with an ability to improve a respective signal quality of communications exchanged with one or more UEs using an APD.

Signaling and Control Transactions for APD Sharing and Handover

FIGS. 7, 8, 9, 10, and 11 illustrate example signaling and control transaction diagrams in accordance with one or more aspects of APD sharing and handover. In aspects, operations of the signaling and control transactions may be performed by any combination of devices, including a first base station (e.g., the base station 121), a second base station (e.g., the base station 122), an APD (e.g., the APD 180), and one or more UEs (e.g., UE 110, UE 111, UE 112) using aspects as described with reference to any of FIGS. 1-6.

Figure 7:
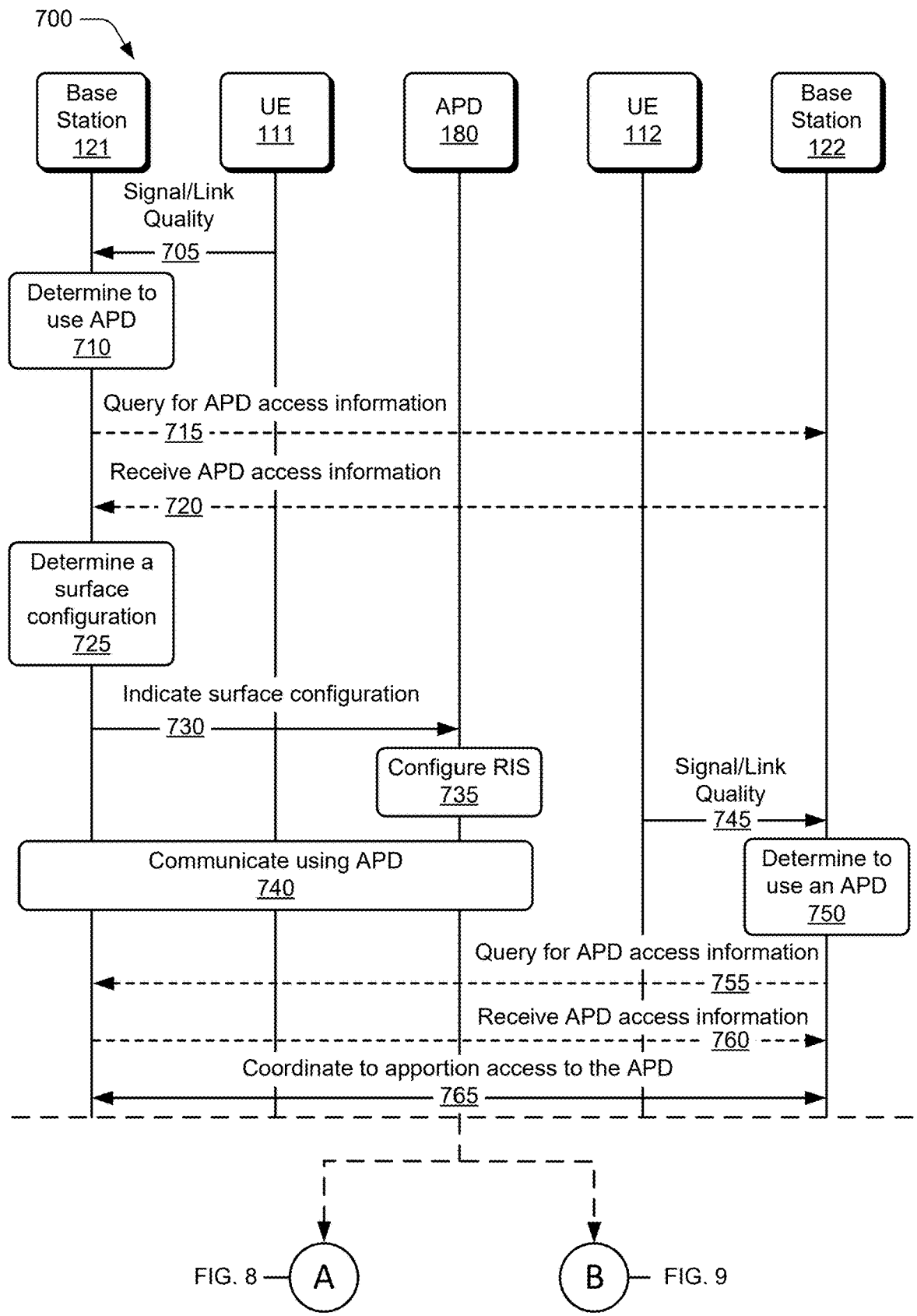
FIG. 7 illustrates an example transaction diagram between various network entities in accordance with various aspects of adaptive phase-changing device sharing and handover.
Figure 8:
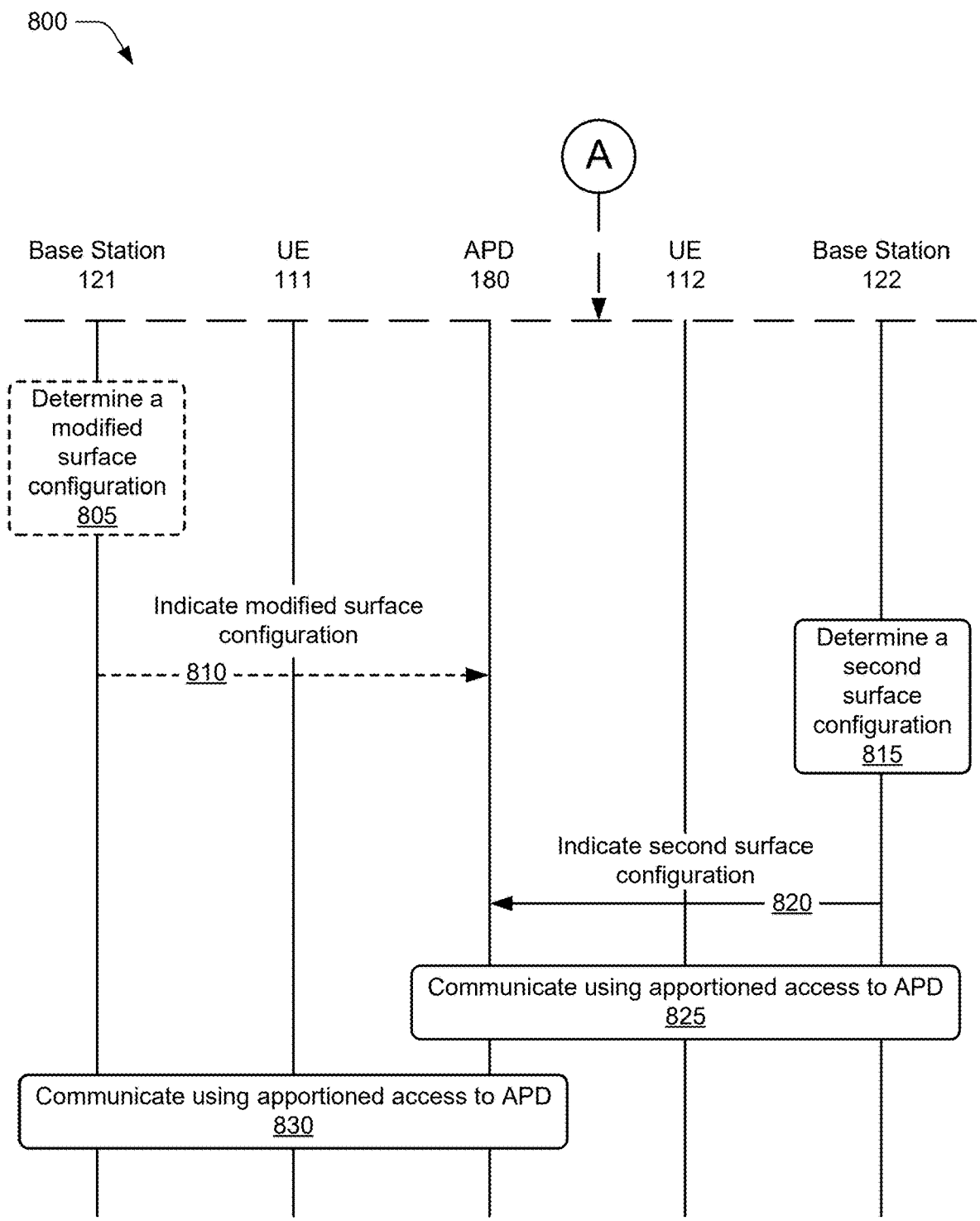
FIG. 8 continues from FIG. 7 and illustrates an example transaction diagram in which each base station of multiple base stations communicates a respective surface configuration to an APD directly in accordance with various aspects of adaptive phase-changing device sharing and handover.
Figure 9:
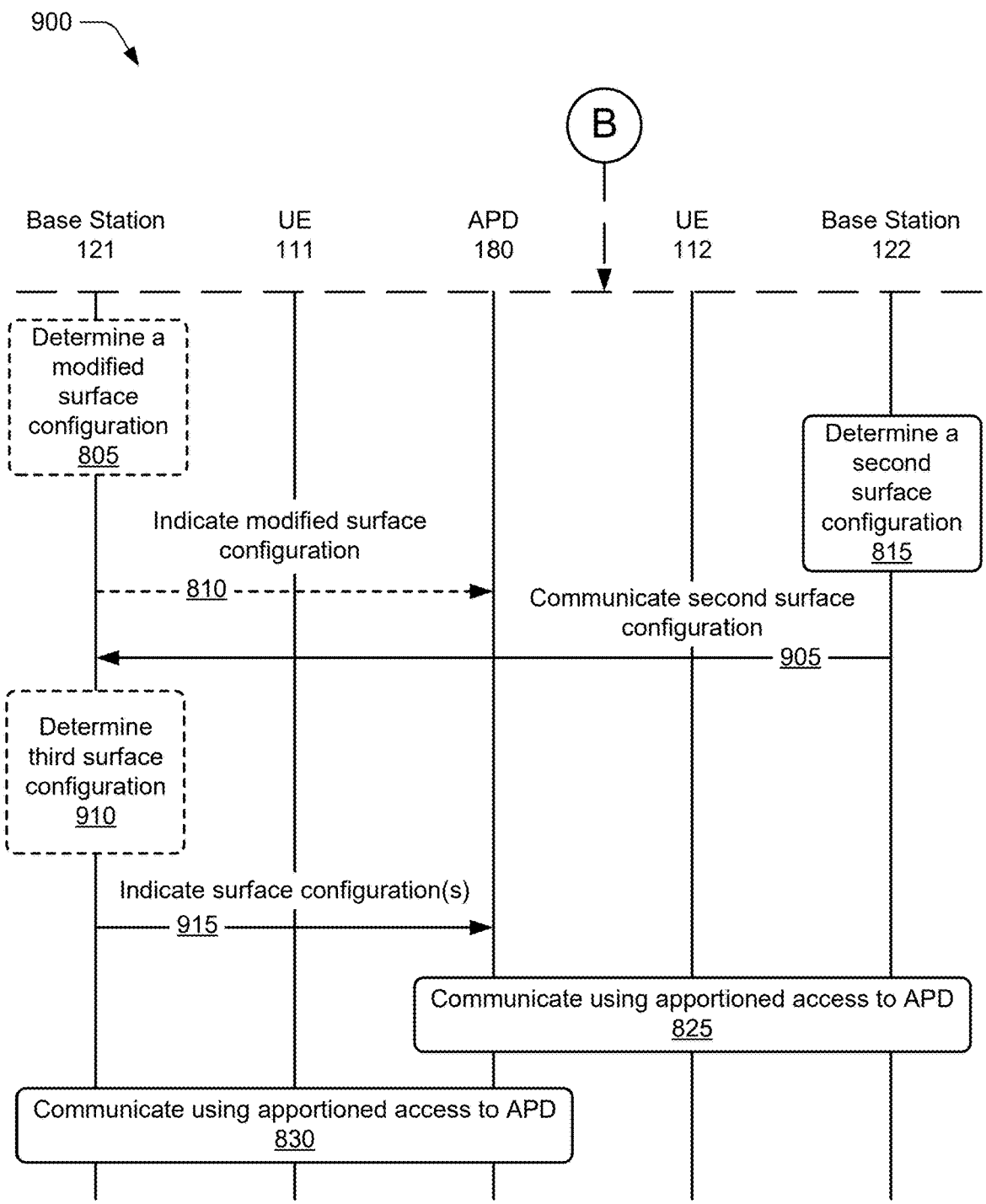
FIG. 9 continues from FIG. 7 and illustrates an example transaction diagram in which a first base station relays a surface configuration to an APD for a second base station in accordance with various aspects of adaptive phase-changing device sharing and handover.

A first example of signaling and control transactions for APD sharing and handover is illustrated by the signaling and control transaction diagram 700 of FIG. 7, where the diagram 700 leads to (a) additional signaling and control transactions as illustrated by FIG. 8, or (b) additional signaling and control transactions as illustrated by FIG. 9. The diagram 700 includes signaling and control transactions among the base station 121, the UE 111, the APD 180, the UE 112, and the base station 122.

As illustrated, at 705, the UE 111 communicates signal-quality measurements, link-quality measurements, measurement reports, and/or other values to the base station 121. For instance, as part of establishing and/or maintaining a wireless link with the UE 111, the base station 121 transmits a radio resource control (RRC) reconfiguration message (not illustrated) that directs the UE to perform measurements. In response to the RRC reconfiguration message, the UE 111 communicates signal and/or link-quality measurements, such as measurement reports, values, or other feedback described with reference to FIG. 6. Alternatively or additionally, the base station 121 communicates threshold values to the UE 111 that indicate a trigger to send the signal and/or link-quality measurements and/or measurement reports. In some aspects, the base station 121 generates signal and/or link-quality measurements using uplink signals received from the UE 111.

At 710, the base station 121 determines to use an APD in a communication path for exchanging wireless signals with the UE 111. For example, the base station 121 analyzes the signal and/or link-quality measurements, measurement reports, and/or other values received at 705 and determines that the signal and/or link-quality measurements indicate a channel impairment, such as by identifying link-quality measurements that do not meet an acceptable performance level. Based on determining to use an APD, the base station 121 identifies the APD 180. To illustrate, the base station 121 receives or determines an estimated UE location (not illustrated) and determines that the estimated UE location falls within a threshold distance to the APD 180. Alternatively or additionally, the base station 121 analyzes historical records using the estimated UE location, and the historical records identify the APD 180 as a suitable APD based on the estimated UE location. In aspects, the base station 121 queries a server for APDs within a threshold distance of the estimated UE location and/or candidate APDs within a cell service area of the base station 121, such as a server included in the core network 150 of FIG. 1.

At 715, base station 121 optionally queries the base station 122 for APD access information that indicates whether the base station 122 is currently using the APD. For example, as part of identifying the APD 180 at 710, the base station 121 queries a server to identify other base stations within operating range of the APD 180 and queries each base station to determine whether or not the base station is currently using the APD. Alternatively, or additionally, the base station 121 optionally queries the APD 180 for unengaged/engaged state information (not illustrated). As yet another example, the base station 121 optionally queries the core network that manages the APD 180 (not illustrated) to identify what base stations are currently utilizing the APD 180. At 720, the base station 121 optionally receives the APD access information from the base station 122 (and/or the APD 180 and/or the core network).

In the diagram 700, and assuming the APD 180 is unengaged and not currently in use, at 725, the base station 121 determines a first surface configuration for the APD 180. To illustrate, and with reference to FIGS. 5 and 6, the base station 121 accesses a codebook and/or historical records using the signal and/or link-quality measurements received at 705 and/or an estimated UE location.

At 730, the base station 121 indicates the first surface configuration to the APD 180, such as by indicating (using an APD-control channel) an index that maps to an entry in a codebook that includes phase vector information. For example, with reference to FIG. 6, the base station 121 communicates the first surface configuration to the APD 180 using the APD-control channel 610. At 735, the APD 180 configures the configurable surface elements of the RIS using the first surface configuration indicated at 730. For example, the APD manager 320 extracts the first surface configuration from the codebooks 316 using the indication and applies the first surface configuration to the RIS 322.

At 740, the base station 121 and the UE 111 communicate using the APD 180. As one example, the base station 121 transmits wireless signal(s) towards a surface of the APD, where the wireless signal(s) strike the surface of the APD 180 and transform/reflect into signal(s) that propagate toward the UE 111.

At 745, and at an arbitrary point in time after the base station 121 has configured the RIS of the APD 180, the base station 122 receives signal and/or link-quality measurements, measurement reports, and/or other values from the UE 112. For instance, and similar to that described at 705, as part of establishing and/or maintaining a wireless link with the UE 112, the base station 122 directs the UE 112 to perform measurements (not illustrated), and the UE 112 communicates the signal and/or link-quality measurements and/or measurement reports. Alternatively or additionally, the base station 122 generates signal and/or link-quality measurements using uplink signals received from the UE 112.

At 750, and similar to that described at 710, the base station 122 identifies an APD to utilize in a communication path for exchanging wireless signals with the UE 112, such as by analyzing the signal and/or link-quality measurements received at 745, determining that the signal and/or link-quality measurements indicate a channel impairment, and identifying an APD to use while communicating with the UE 112. As one example, the base station 122 queries a server for APDs within a threshold distance of an estimated UE location for the UE 112 and/or candidate APDs within a cell service area of the base station 122, such as a server included in the core network 150 of FIG. 1.

At 755, and similar to that described at 715, the base station 122 optionally queries the base station 121 for APD access information that indicates whether the base station 121 is currently using the APD in a communication path for a wireless link. As one example, the base station 122 queries the base station 121 using the interface 106. At 760, the base station 122 optionally receives the APD access information from the base station 121 (and/or the APD 180).

At 765, and assuming the base station 121 indicates, to the base station 122 at 760, that it is currently using the APD 180, the base station 121 and the base station 122 negotiate and/or coordinate with one another to apportion access to the APD 180. To illustrate, the base station 121 and the base station 122 determine to time-share APD 180 by using time partitioning, where the base stations agree to use (and/or configure) the surface of the APD during different time durations. For example, during a first time-duration, the base station 121 configures the surface of the APD 180 using a first surface configuration and transmits/receives signals using the surface of the APD 180 as further described. During the first time-duration, the base station 122 refrains from configuring and/or using the surface of the APD 180. During a second time-duration that does not overlap with the first time-duration, the base station 122 configures the surface of the APD 180 using a second surface configuration and transmits/receives signals using the surface of the APD while the base station 121 refrains from configuring and/or using the surface of the APD 180. The time divisions do not have to be equal and may depend on the amount of data buffered for transmission by each base station, the beamforming gain requested by the base station, the frequency bandwidth of the carrier signals, and other factors.

Alternatively or additionally, the base stations 121 and 122 apportion APD access using configurable-surface-element partitioning, where the base stations agree to use (and/or configure) different subsets of configurable surface elements that form the RIS. For example, with reference to FIG. 5, the base stations 121 and 122 apportion the configurable surface element 502 to the base station 121 and the configurable surface element 506 to the base station 122. This can include any type of partitioning, such as horizontal partitioning that groups elements in a same horizontal row, vertical partitioning that groups elements in a same vertical column, quadrant partitioning, and so forth. The configurable-surface-element partitions do not have to be equal and may depend on the amount of data buffered for transmission by each base station, the coverage area or beam area of each base station's signals with its UE, the beamforming gain requested by the base station, the frequency bandwidth of the carrier signals, each device's MIMO configurations, and other factors.

In some aspects, as part of coordinating access to the APD at 765, the base stations 121 and 122 additionally apportion physical resources of an APD-control channel. To illustrate, instead of the base station 121 and the base station 122 communicating with the APD 180 using (separate) base station-specific APD-control channels (such as shown in FIG. 6 elements 610, 612), the base station 121 and the base station 122 share the physical resources of an APD-control channel, such as when the APD 180 only supports a single physical APD-control channel instead of multiple physical APD-control channels. A single physical APD-control channel, however, may support receipt of APD-control messages directly from different base stations.

Accordingly, at 765, the base station 121 and the base station 122 optionally apportion the physical resources of a (shared) APD-control channel to avoid contentions. To illustrate, the base stations 121 and 122 agree to apportion the air interface resources of a single APD-control channel by assigning a first resource block of the APD-control channel to the base station 121 and a second resource block of the APD-control channel to the base station 122. Alternatively or additionally, the base stations 121 and 122 agree to assign a first control channel element (CCE) (e.g., resource element (RE), resource element group (REG)) to the base station 121 and a second CCE to the base station 122. As yet another example, the base stations 121 and 122 agree to assign a first time slot of the shared APD-control channel to the base station 121 and a second time slot of the APD-control channel to the base station 122. When sharing an APD-control channel, the base stations may include a base station identifier in their APD-control messages over the same physical APD-control channel.

At this point, the diagram 700 can proceed to at least two alternative paths: option "A" (described in FIG. 8) or option "B" (described in FIG. 9). FIG. 8 depicts a signaling and control transaction diagram 800 in which each base station communicates a respective surface configuration to an APD directly, either by each base station using a (respective) base station-specific APD control channel (e.g., both APD-control channels 610 and 612) or by the base stations sharing a same APD-control channel by partitioning control-channel resources. FIG. 9 depicts a signaling and control transaction diagram 900 in which a first base station relays a surface configuration to an APD for a second base station (e.g., using only APD-control channel 610 and not APD-control channel 612).

Continuing to option "A" in FIG. 8, at 805, the base station 121 optionally determines a modified first surface configuration in a manner similar to that described at 725 of FIG. 7. However, at 805, the base station 121 determines the modified first surface configuration based on apportioned access to the APD 180, whereas at 725 in the diagram 700, the base station 121 determined the first surface configuration assuming the APD 180 was not being used by any other base station (e.g., unengaged). In other words, at 805, the base station 121 determines the modified first surface configuration based on the apportioned access determined and allocated to the base station 121 at 765 of FIG. 7, such as a surface configuration for a subset of configurable surface elements and/or a time-shared surface configuration based on time partitioning as further described. As noted, sometimes the original surface configuration 725 does not use the entire APD surface, so no modified surface configuration is needed to accommodate the first UE 111 in light of the additional supported UE 112.

At 810, the base station 121 optionally indicates the modified first surface configuration to the APD 180. In aspects, the base station 121 indicates the modified first surface configuration using a first APD-control channel (e.g., APD-control channel 610).

At 815, the base station 122 determines a second surface configuration. To illustrate, and with reference to FIGS. 5 and 6, the base station 122 accesses a codebook and/or historical records using the signal and/or link-quality measurements received at 745 and/or an estimated UE location of the UE 112. In aspects, the base station 122 determines the second surface configuration based on the apportioned access to the APD 180 that was determined and allocated to the base station 122 at 765 of FIG. 7.

At 820, the base station 122 indicates the second surface configuration to the APD 180. In aspects, the base station 122 indicates the second surface configuration using a second APD-control channel (e.g., APD-control channel 612) that is base-station specific. To illustrate, assume the APD 180 supports multiple APD-control channels such that each base station communicates with the APD 180 using a base-station-specific APD-control channel. Alternatively, or additionally, the base station 122 indicates the second surface configuration using apportioned air interface resources of a shared APD-control channel (e.g., shared with the base station 121).

At 825, the base station 122 communicates with the UE 112 using apportioned access to the APD 180. To illustrate, at 825, the base station 122 directs the APD 180 to apply the second surface configuration indicated at 820 and transmits wireless signals to (and/or receives wireless signals from) the UE 112 using the surface of the APD 180 based on the apportioned access determined at 765. Similarly, at 830, the base station 121 communicates with the UE 111 using apportioned access to the APD 180 by directing the APD to apply the modified surface configuration indicated at 810 to the surface of the APD 180 and using the APD based on the apportioned access determined at 765.

Returning to the completion of the diagram 700 of FIG. 7, the diagram can proceed alternatively to option "B," which is described in FIG. 9. Similar to that described with reference to FIG. 8, at 805, the base station 121 optionally determines a modified first surface configuration based on the apportioned access to the APD 180 and optionally indicates the modified first surface configuration to the APD 180 at 810. However, in alternative aspects, the base station 121 waits to determine a third surface configuration as further described at 910. To illustrate, assume that as part of coordinating to apportion access to the APD at 765 of FIG. 7, the base station 122 requests that the base station 121 relay a second surface configuration to the APD 180 on behalf of the base station 122. Based on the request, the base station 121 determines to wait until after receiving the second surface configuration before modifying the first surface configuration determined at 725 and thus does not perform 805, 810.

At 815, the base station 122 determines a second surface configuration, such as by accessing a codebook and/or historical records using the signal and/or link-quality measurements received at 745 and/or based on the apportioned access to the APD 180 that was determined and allocated to the base station 122 at 765 of FIG. 7.

At 905, the base station 122 communicates the second surface configuration to the base station 121. For example, the base station 122 communicates, using the interface 106, an index that maps to an entry in a codebook as further described. Alternatively or additionally, the base station 122 communicates timing information, such as a time duration to apply the second surface configuration, a start time to apply the second surface configuration, and/or a stop time to cease using the second surface configuration. Thus, instead of using a second APD-control channel and/or sharing an APD-control channel with the base station 121, the base station 122 communicates the second surface configuration to the first base station 121. This inter-base station communication may use interface 106. In some aspects, the base station 122 implicitly directs the base station 121 to configure the APD by communicating the second surface configuration, while in other aspects, the base station 122 explicitly directs the base station 121 to configure the APD by communicating an APD-configure command.

At 910, the base station 121 optionally determines a third surface configuration, such as by analyzing the modified first surface configuration determined at 805 and the second surface configuration and determining a third (aggregated) surface configuration suitable for communications transmitted and received by both the base station 121 and the base station 122. Alternatively or additionally, the base station 121 optionally analyzes the modified (or unmodified) first surface configuration and the second surface configuration to identify if any incompatibilities exist (e.g., overlapping configurable-surface-element usage, overlapping time durations). In response to identifying incompatibilities, the base station 121 optionally determines a third surface configuration that corrects the incompatibilities and notifies the base station 122 of the adjustments to the third surface configuration and/or directs the base station 122 to determine a modified third surface configuration based on the identified incompatibilities (not illustrated).

At 915, the base station 121 indicates one or more surface configurations to the APD 180, such as the modified first surface configuration, the second surface configuration, and/or the third surface configuration. In aspects, the base station 121 indicates the surface configuration(s) using an APD-control channel (e.g., APD-control channel 610). Accordingly, at times, the base station 121 relays the modified surface-configuration information to the APD 180 and on behalf of the base station 122. Alternatively or additionally, the base station 121 transmits control information over the APD-control channel that indicates when to apply the modified first surface configuration, when to remove the modified first surface configuration, when to apply the second surface configuration, when to remove the second surface configuration, and so forth. As described with reference to FIG. 8, at 825, the base station 122 and the UE 112 communicate using apportioned access to the APD and at 830, the base station 121 and the UE 111 communicate using apportioned access to the APD.

Figure 10:
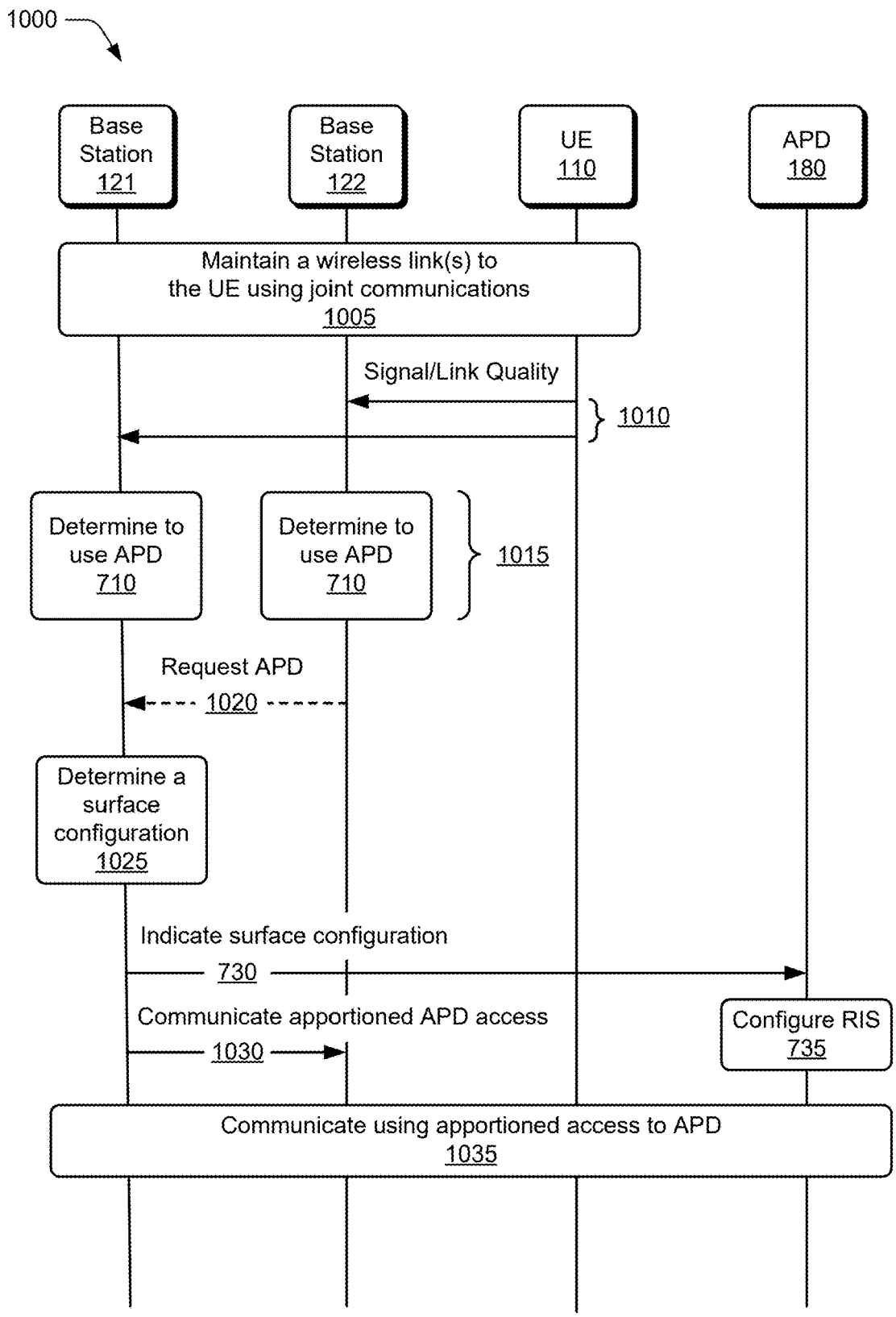
FIG. 10 illustrates an example transaction diagram between various network entities in accordance with various aspects of adaptive phase-changing device sharing and handover.

A second example of signaling and control transactions for APD sharing and handover is illustrated by the signaling and control transaction diagram 1000 of FIG. 10. The diagram 1000 includes example signaling and control transactions among the base station 121, the base station 122, the UE 110, and the APD 180.

As illustrated, at 1005, the base station 121, the base station 122, and the UE 110 maintain one or more wireless links to the UE using coordinated communications. To illustrate, the base station 121 and the base station 122 maintain the wireless links using dual-connectivity, carrier aggregation, and/or various types of CoMP techniques. For illustrative purposes, the base station 121 will provide the Master Node, Primary Cell, or Anchor point, and the base station 122 will provide the Secondary Node or Secondary Cell.

At 1010, the UE 110 transmits respective signal and/or link-quality measurements to the base station 121 and/or the base station 122. To illustrate, and with reference to FIG. 6, the UE 110 transmits RSSI, power information, SINR, RSRP, CQI, CSI, Doppler feedback, BLER, QoS, and/or HARQ information to the base station 121, where the signal and/or link-quality measurements are based on downlink communications from the base station 121. Alternatively or additionally, the UE 110 transmits similar signal and/or link-quality measurements to the base station 122 that are based on downlink communications from the base station 122. In aspects, the base station 121 and/or the base station 122 generate respective signal and/or link-quality measurements from received uplink signals from the UE 110 (not illustrated).

At 1015, the base station 121 and/or the base station 122 determine to use an APD as described at 710 of FIG. 7. As one example, the base station 122 determines to use an APD based on the respective signal and link-quality measurements from the UE 110 while the base station 121 does not (or vice versa). In other words, the respective signal and link-quality measurements received by the base station 122 indicate a channel impairment, while the respective signal and link-quality measurements received by the base station 121 do not indicate a channel impairment. As another example, both the base station 121 and the base station 122 determine to use an APD. In some aspects, the base station 121 and/or the base station 122 identify and/or select the APD 180 as further described with reference to FIG. 7.

At 1020, the base station 122 optionally communicates a request to the base station 121 that requests to use the APD 180 in a communication path for a wireless communication link with the UE 110. To illustrate, assume the base station 121 acts as a coordinating and/or anchor base station for the coordinated communications as described at 1005. In aspects, the base station 122 requests, from the coordinating and/or anchor base station, to utilize an APD when transmitting (and/or receiving) wireless signals to the UE 110, such as by communicating the request using the interface 106. Alternatively, or additionally, the base station 122 includes an APD identifier in the request that indicates to use the APD 180. In some aspects, the base station 122 communicates a surface configuration to the base station 121, such as that described at 815 and/or 905 of FIG. 9 (not illustrated in FIG. 10).

At 1025, the base station 121 determines one or more surface configurations for the APD. In some aspects, this includes determining apportioned access to the APD 180 for sharing the APD 180 between at least the base station 121 and the base station 122. Alternatively or additionally, this includes determining apportioned access to the APD 180 with other base stations not participating in the joint communications (not illustrated), such as that described at 765 of FIG. 7. Thus, the base station 121 may determine a surface configuration based on apportioned access. In other words, the base station 121 can determine a first surface configuration for a first subset of configurable surface elements, a second surface configuration for a second subset of configurable surface elements, a third configuration for all configurable surface elements over a first time-duration, a fourth configuration for all configurable surface elements over a second time-duration, and so forth, based on the apportioned access.

At 730, the base station indicates the surface configuration(s) to the APD 180, such as through an APD-control channel, as further described. Based on receiving the indication, the APD 180 configures the RIS using the surface configuration(s) at 735, as described with reference to FIG. 7.

At 1030, the base station 121 communicates the apportioned access to the secondary base station 122. For example, the base station 121 communicates, through the interface 106, a subset of configurable surface elements and/or a time duration to the base station 122 and directs the base station 122 to access and/or use the APD 180 based on the apportioned access. Accordingly, and similar to that described with reference to FIG. 8, the base station 121, the base station 122, and the UE 110 communicate using the apportioned access to the APD 180 at 1035.

The diagram 1000 illustrates example signaling and control transactions where a coordinating and/or anchor base station (e.g., base station 121) (a) can determine surface configurations for multiple base stations participating in coordinated communications with a UE and (b) can configure an APD for the multiple base stations. However, in alternative examples, each of the multiple base stations determines a respective surface configuration (based on apportioned access) and communicates directly with the APD, such as that described with reference to the diagram 800 of FIG. 8.

Figure 11:
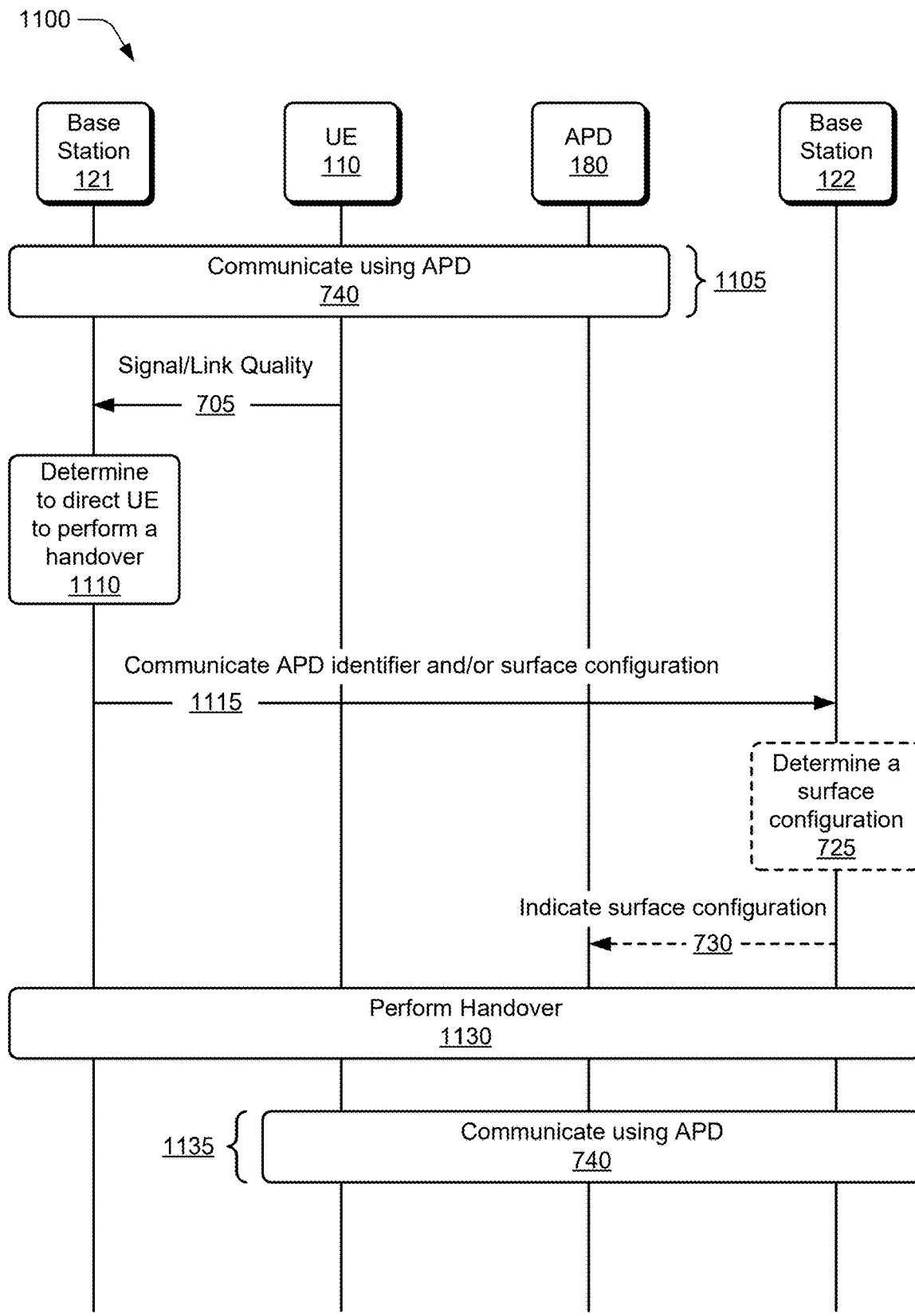
FIG. 11 illustrates an example transaction diagram between various network entities in accordance with various aspects of adaptive phase-changing device sharing and handover.

A third example of signaling and control transactions for APD sharing and handover is illustrated by the signaling and control transaction diagram 1100 of FIG. 11. The diagram 1100 includes example signaling and control transactions among the base station 121, the base station 122, the UE 110, and the APD 180.

The diagram 1100 begins at 1105 and corresponds to a first instance of the signaling and control transactions performed at 740 of FIG. 7, where the base station 121 and the UE 110 communicate with one another using the APD 180. In aspects, the diagram 1100 represents a continuation of FIG. 7 at 740. In other words, the diagram 1100 can include some or all of the signaling and control transactions at 705, 710, 715, 720, 725, 730, and/or 735, as described with reference to FIG. 7, but are not illustrated in FIG. 7 for visual brevity. Alternatively or additionally, the diagram 1110 can begin at 825 of FIG. 8, where the base station 121 communicates with the UE 110 using apportioned access to the APD 180.

At 705, and as described with reference to FIG. 7, the UE 110 transmits signal and/or link-quality measurements to the base station 121. At 1110, the base station 121 determines to direct the UE to perform a handover. To illustrate, the base station 121 analyzes the signal and/or link-quality measurements and determines that the base station 122 provides better signal quality (e.g., higher received power levels) to the UE 110 relative to the base station 121. In determining to direct the UE to perform a handover, the base station 121 alternatively or additionally selects the base station 122 as the target base station based on analyzing the signal and/or link-quality measurements.

At 1115, the base station 121 communicates an APD identifier of the APD 180 and/or a surface configuration to the (target) base station 122. As one example, the base station 121 indicates an index value that maps to an entry into a codebook of phase vectors to the base station 122 by using an inter-base station interface (e.g., interface 106). The base station 121 communicates, as the surface configuration, a surface configuration used to configure a surface of the APD 180, where the base station 121 and/or the UE 110 use the configured surface to exchange wireless signals as further described.

As described with reference to FIG. 7, at 725, the base station 122 optionally determines a surface configuration for the APD 180. As one example, the base station 122 analyzes the surface configuration received at 1115 and determines a modified surface configuration based on location information of the base station 121, location information of the base station 122, and/or an estimated UE location of the UE 110 to identify a phase vector that configures the surface of the APD 180 with similar properties, such as a reflection angle to the UE 110 for a signal originating from the base station 122 instead of the base station 121. Accordingly, at 730, the base station 122 optionally indicates the surface configuration to the APD 180, such as by using an APD-control channel.

At 1130, the base station 121, the base station 122, and the UE 110 perform a handover. For example, the (source) base station 121 sends a Handover Request message to the (target) base station 122. The (target) base station 122 determines air interface resources for the UE 110 to use when performing the handover and/or transmits a Handover Request Acknowledge message to the (source) base station 121. Alternatively or additionally, the (source) base station 121 sends a handover command to the UE 110, the UE 110 disconnects from the (source) base station 121, and connects to the (target) base station 122.

At 1135, the base station 122 and the UE 110 wirelessly communicate with one another using the APD 180, as described at 740 of FIG. 7. The base station 122, for instance, transmits one or more wireless signals towards a surface of the APD configured with the surface configuration indicated at 730 (e.g., a subset of and/or all configurable surface elements), where the signal(s) strike the surface of the APD 180 and transforms into signal(s) that propagate toward the UE 110.

The order of the signaling and control transactions illustrated in the diagrams 700, 800, 900, 1000, and 1100 are not intended to be construed as a limitation, and any number of the signaling and control transactions can be reordered. To illustrate, with reference to diagram 1100, the transactions described at 1115, 725, and/or 730 can be performed at part of, or after, the transactions described at 1130.

Example Methods for APD Sharing and Handover

Figure 12:
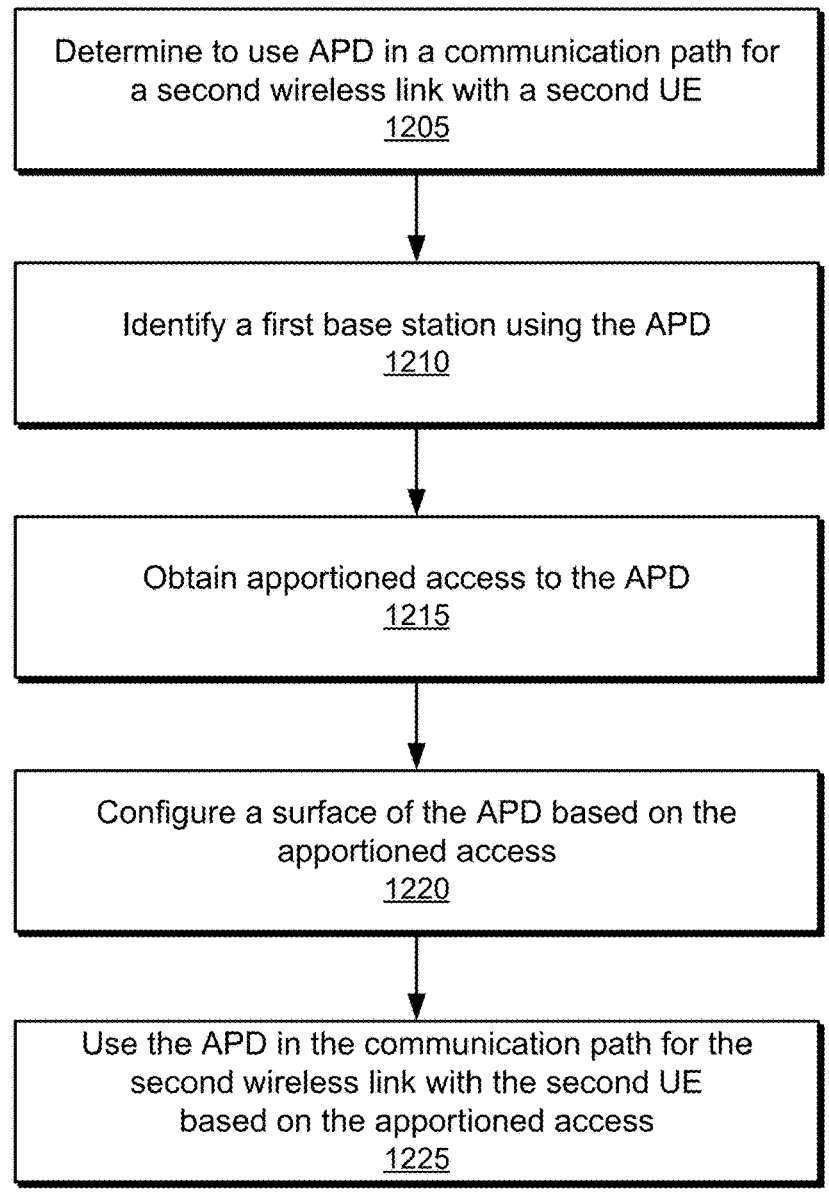
FIG. 12 illustrates an example method for sharing an APD between at least two base stations in accordance with various aspects of adaptive phase-changing device sharing and handover.

Example methods 1200, 1300, 1400, and 1500 are described with reference to FIGS. 12, 13, 14, and 15 in accordance with one or more aspects of APD sharing and handover. FIG. 12 illustrates an example method 1200 used to perform aspects of APD sharing and handover, such as a second base station initiating coordinating with a first base station to apportion access to an APD. In some implementations, operations of the method 1200 are performed by the second base station, such as the base station 122 of FIG. 7.

At 1205, a base station determines to use an APD in a communication path for a second wireless link with a first UE. As one example, the base station 122 determines to use the APD 180 as described at 750 of FIG. 7 and/or similar to that described at 710 of FIG. 7.

At 1210, the base station identifies a first base station using the APD. To illustrate, the base station 122 identifies what base stations are within operating range of the APD 180, such as by accessing a core network, and queries the base station 121 using an inter-base station interface (e.g., interface 106) as described at 755 of FIG. 7. As another example, the base station 122 queries the core network 150 to identify what base stations currently utilize the APD 180 or queries the APD 180 for APD access information using an APD-control channel. In some aspects, the first base station uses the APD in a communication path with another UE.

At 1215, the base station obtains apportioned access to the APD. For example, as described at 765 of FIG. 7, the base station 122 coordinate with the base station 121 to determine and obtain the apportioned access to the APD 180, such as time-partitioned access and/or configurable-surface-element-partitioned access. As another example, the base station 122 requests an APD-access allocation from the APD 180 using the APD-control channel.

At 1220, the base station configures a surface of the APD based on the apportioned access. To illustrate, as described at 725 of FIG. 7 and 815 of FIG. 8, the base station 122 determines the surface configuration of the APD 180 based on any combination of signal and/or link-quality measurements, measurement reports, estimated UE location information, APD time-partitioning allocations to the base station 122, and/or configurable-surface-element partitioning allocations to the base station 122. In some aspects, the base station 122 indicates the surface configuration to the APD 180 using a base station-specific APD-control channel (e.g., the APD-control channel 612) or a shared APD-control channel. Alternatively, or additionally, the base station 122 communicates the surface configuration to the base station 121.

At 1225, the base station uses the APD in a communication path for the second wireless link with the second UE using the APD and based on the apportioned access. For example, as described at 815, 820, and 830 of FIG. 8, the base station 122 determines the second surface configuration based on the apportioned access, indicates the second surface configuration to the APD 180 to direct the APD to configure the surface, and uses the APD in a communication path for wireless signals associated with the second wireless link with the second UE.

Figure 13:
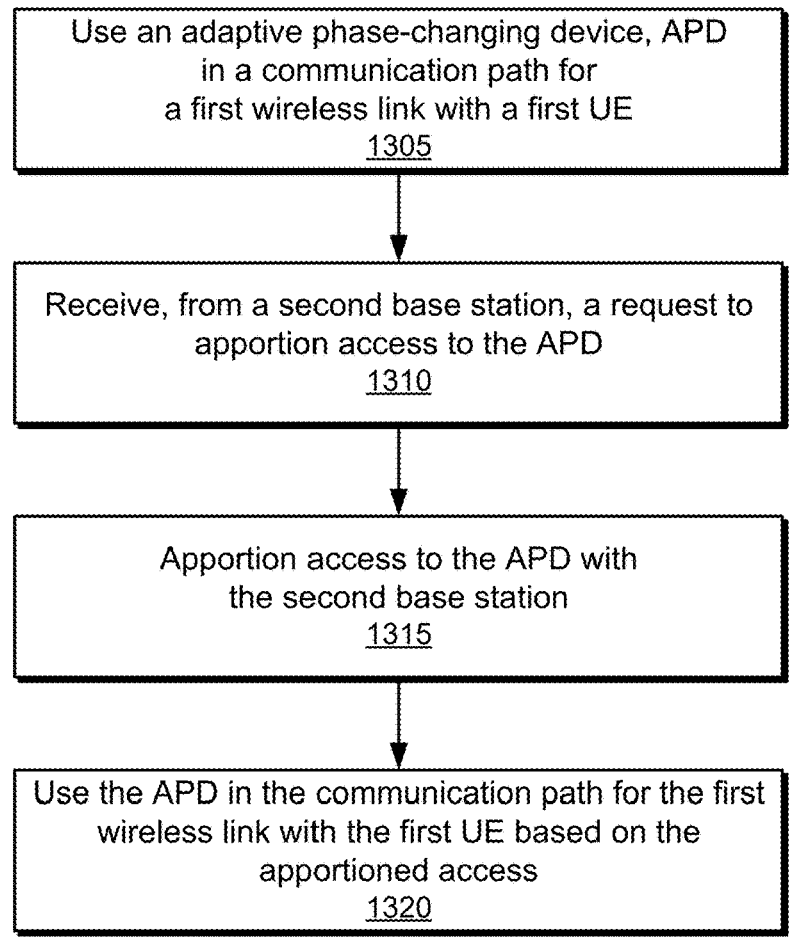
FIG. 13 illustrates an example method for sharing an APD between at least two base stations in accordance with various aspects of adaptive phase-changing device sharing and handover.

FIG. 13 illustrates an example method 1300 used to perform aspects of APD sharing and handover, such as a first base station receiving a request from a second base station to apportion access to an APD. In some implementations, operations of the method 1300 are performed by the first base station, such as the base station 121 of FIG. 7.

At 1305, a first base station uses an APD in a communication path for a first wireless link with a first UE. To illustrate, the base station 121 uses the APD 180 in a communication path for a wireless link with the UE 111 as described at 740 of FIG. 7.

At 1310, the first base station receives, from a second base station, a request to apportion access to the APD. For example, the base station 121 receives a request from the base station 122 to apportion access to the APD 180, as described at 765 of FIG. 7.

At 1315, the first base station apportions access to the APD with the second base station. To illustrate, the base station 121 apportions access to the APD 180 by coordinating with the base station 122 by querying the APD 180 and/or querying the core network as described at 765 of FIG. 7.

At 1320, the first base station uses the APD in the communication path for the first wireless link with the first UE based on the apportioned access. For example, as described at 805, 810, and 825 of FIG. 8, the base station 121 determines a modified surface configuration based on the apportioned access, indicates the modified surface configuration to the APD 180 to direct the APD to reconfigure the surface, and uses the APD in the communication path for the first wireless link with the first UE based on apportioned access.

Figure 14:
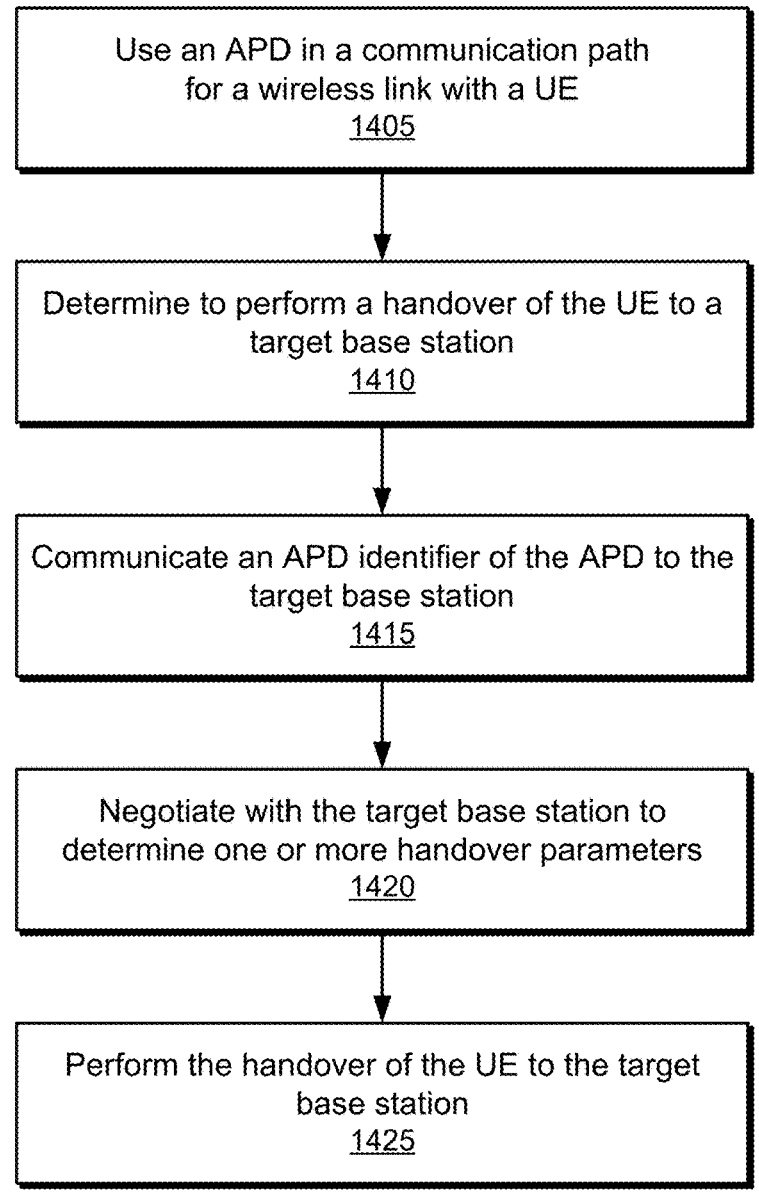
FIG. 14 illustrates an example method for performing a handover of a UE that includes an APD in a communication path for a wireless link in accordance with various aspects of adaptive phase-changing device sharing and handover.

FIG. 14 illustrates an example method 1400 used to perform aspects of APD sharing and handover, such as a source base station performing a handover of a UE to a target base station by providing APD information. In some implementations, operations of the method 1400 are performed by the source base station, such as the base station 121 of FIG. 11.

At 1405, a source base station uses an APD in a communication path for a wireless link with a UE. To illustrate, the base station 121 communicates with the UE 110 by transmitting wireless signals towards a surface of the APD 180 as described at 740 of FIG. 7 and at 1105 of FIG. 11, where the wireless signals strike the surface of the APD 180 and reflect towards the UE 110. Alternatively or additionally, the base station 121 receives wireless signals (originating from the UE 110) that have been reflected off the surface of the APD 180. In aspects, and as part of establishing and/or maintaining the wireless link with the UE 110, the source base station communicates a source-base-station-to-user-equipment (source-to-UE) surface configuration to the APD 180 and directs the APD 180 to configure a surface (e.g., RIS 322) of the APD 180 using the source-to-UE surface configuration.

At 1410, the source base station determines to perform a handover of the UE to a target base station. The base station 121, for example, receives signal and/or link-quality measurements, measurement reports, and/or other values from the UE 110 as described at 705 with reference to FIG. 7 and FIG. 11, and determines to direct the UE 110 to perform a handover to the base station 122 as described at 1110 of FIG. 11.

At 1415, the source base station communicates an APD identifier of the APD to the target base station. To illustrate, the base station 121 communicates the APD identifier of the APD 180 to the base station 122 through the interface 106 as described at 1115 of FIG. 11. Alternatively or additionally, the base station 121 indicates a surface configuration to the base station 122, such as the source-to-UE surface configuration used to configure the surface of the APD 180 to maintain the wireless link with the UE 110 as described at 1405.

At 1420, the source base station negotiates with the target base station to determine one or more handover parameters. For instance, the base station 121 negotiates air interface resources with the base station 122, as described at 1130 of FIG. 11.

At 1425, the source base station performs the handover of the UE to the target base station. As one example, the base station 121 directs the UE 110 to perform a handover to the base station 122 using the negotiated handover parameters and disconnects with the UE 110. In some aspects, the source base station directs the target base station, either explicitly or implicitly, to include the APD in a communication path for a wireless link between the UE and the target base station.

Figure 15:
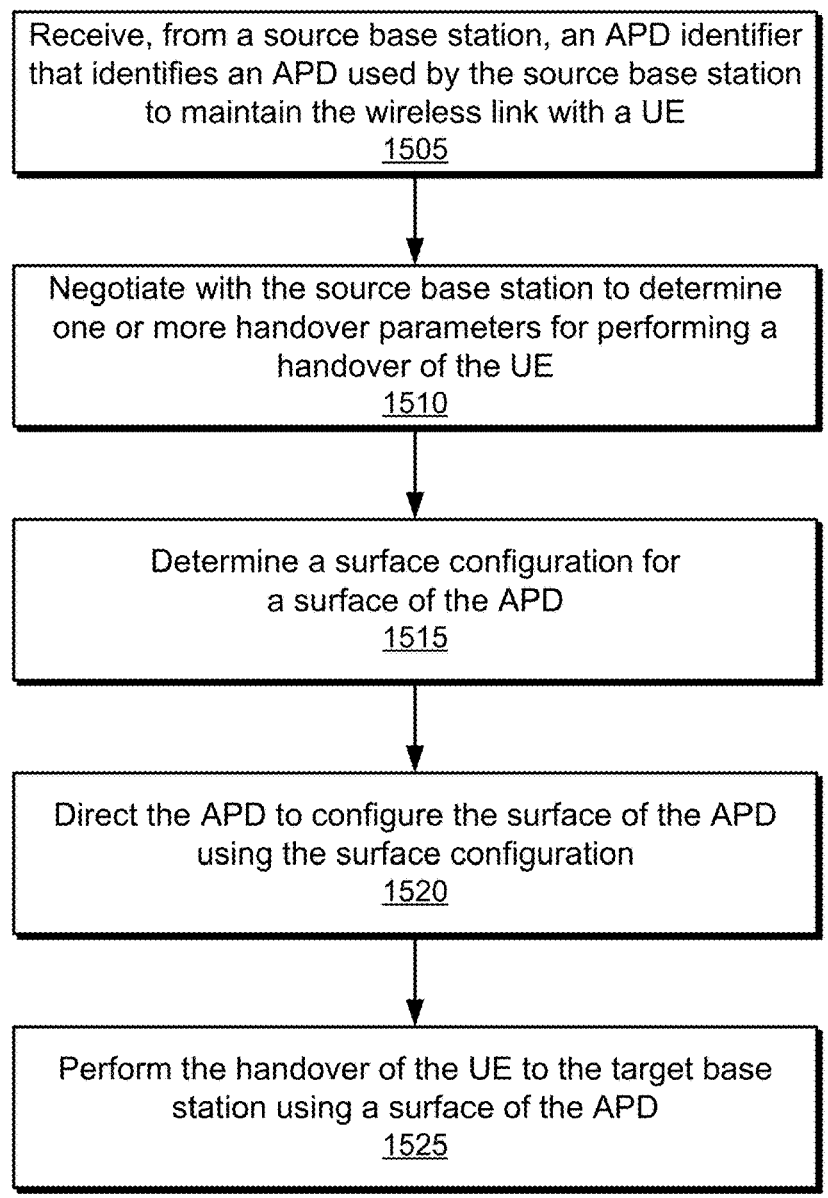
FIG. 15 illustrates an example method for performing a handover of a UE that includes an APD in a communication path for a wireless link in accordance with various aspects of adaptive phase-changing device sharing and handover.

FIG. 15 illustrates an example method 1500 used to perform aspects of APD sharing and handover, such as a source base station performing a handover of a UE to a target base station by providing APD information. In some implementations, operations of the method 1500 are performed by the target base station, such as the base station 122 of FIG. 11.

At 1505, a target base station receives, from a source base station, an APD identifier that identifies an APD used by the source base station to maintain the wireless link with a UE.

The base station 122, for instance, receives the APD identifier from the base station 121 over the interface 106 as described at 1115 of FIG. 11. Alternatively or additionally, the target base station receives an indication of a source-to-UE surface configuration used by the source base station to configure the surface of the APD 180.

At 1510, the target base station negotiates with the source base station to determine one or more handover parameters for performing a handover of the UE. As one example, the base station 122 negotiates air interface resources with the base station 121, as described at 1130 of FIG. 11.

At 1515, the target base station determines a surface configuration for a surface of the APD. To illustrate, and as described at 725 of FIG. 7 and FIG. 11, the base station 122 determines a target-base station-to-user equipment (target-to-UE) surface configuration using location information of base station 121, location information of the base station 122, the source-to-UE surface configuration received at 1505, and/or an estimated UE location of the UE 110 to identify a phase vector that configures the surface of the APD 180 to reflect a signal originating from the target base station towards the UE 110.

At 1520, the target base station directs the APD to configure the surface of the APD using the target-to-UE surface configuration. As one example, as described at 730 of FIG. 7 and FIG. 11, the base station 122 indicates the target-to-UE surface configuration to the APD 180 using an APD-control channel. Alternatively or additionally, the base station 122 communicates the target-to-UE surface configuration to the base station 121, as described at 905 of FIG. 9.

At 1525, the target base station performs the handover of the UE to the target base station. The base station 122, for instance, performs a handover of the UE 110 as described at 1130 of FIG. 11 such that the UE 110 disconnects from the base station 121 and connects to the base station 122. In some aspects, the target base station uses the APD to perform the handover, such as by using a surface of the APD in a communication path for communicating with the UE 110.

The order in which the method blocks of the method 1200, 1300, 1400, and 1500 are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following, several examples are described

Example 1: A method performed by a second base station for sharing an adaptive phase-changing device with a first base station, the method comprising: determining to use an adaptive phase-changing device, APD, in a second communication path for a second wireless link with a second user equipment, UE; identifying a first base station using the APD; obtaining apportioned access to the APD; configuring a surface of the APD based on the apportioned access; and using the APD in the communication path for the second wireless link with the second UE based on the apportioned access.

Example 2: The method as recited in example 1, wherein the APD includes multiple configurable surface elements, and wherein obtaining the apportioned access to the APD further comprises: coordinating with the first base station or the APD to: apportion a first subset of configurable surface elements of the multiple configurable surface elements to the first base station; and apportion a second subset of configurable surface elements of the multiple configurable surface elements to the second base station.

Example 3: The method as recited in example 2, wherein coordinating the second wireless link with the second UE using the APD further comprises: transmitting a second wireless signal towards the second subset of configurable surface elements concurrently with a first wireless signal transmitted by the first base station towards the first subset of configurable surface elements.

Example 4: The method as recited in example 1 or example 2, wherein obtaining the apportioned access to the APD further comprises: coordinating with the first base station or the APD to apportion the APD to the first base station over a first time-duration; and apportion the APD to the second base station over a second time-duration that does not overlap with the first time-duration.

Example 5: The method as recited any one of examples 1 to 4, further comprising: receiving, from the second UE, at least one link-quality measurement that is indicative of a channel impairment; and determining to use the APD based on the at least one link-quality measurement that is indicative of the channel impairment.

Example 6: The method as recited in example 5, wherein configuring the surface of the APD further comprises: determining, using the at least one link-quality measurement, a surface configuration for the APD that mitigates the channel impairment by transforming characteristics of a wireless signal propagated between the second base station and the second UE; and transmitting, to the APD, an indication of the surface configuration using an adaptive phase-changing device wireless control channel, APD-control-channel.

Example 7: The method as recited in example 6, further comprising: apportioning access to the APD-control-channel by negotiating with the first base station.

Example 8: The method as recited in example 7, wherein apportioning access to the APD-control-channel further comprises: apportioning a first resource block of the APD-control-channel to the first base station; and apportioning a second resource block of the APD-control-channel to the second base station.

Example 9: The method as recited in example 7 or example 8, wherein apportioning access to the APD-control-channel further comprises: apportioning a first time slot of the APD-control-channel to the first base station; and apportioning a second time slot of the APD-control-channel to the second base station.

Example 10: The method as recited in any one of examples 6 to 9, wherein transmitting the indication of the surface configuration using the APD-control-channel further comprises: transmitting a base station identifier of the second base station to the APD.

Example 11: The method as recited in example 6, wherein transmitting the indication of the surface configuration using the APD-control-channel further comprises: using a base-station-specific APD-control-channel.

Example 12: The method as recited in any one of examples 1 to 5, further comprising determining, using the at least one link-quality measurement, a surface configuration for the APD that mitigates the channel impairment by transforming characteristics of a wireless signal propagated between the second base station and the second UE; and communicating the surface configuration to the first base station; and directing the first base station to configure the APD using the surface configuration and based on the apportioned access.

Example 13: The method as recited in example 12, wherein directing the first base station to configure the APD further comprises: implicitly directing the first base station to configure the APD by communicating the surface configuration.

Example 14: The method as recited in example 12 or example 13, wherein directing the first base station to configure the APD further comprises: communicating timing information to the second base station that indicates when to apply the surface configuration.

Example 15: The method as recited in any one of examples 1 to 14, wherein obtaining the apportioned access to the APD further comprises: communicating with the second base station using an Xn interface.

Example 16: The method as recited in any one of examples 1 to 15, further comprising: determining to perform a handover of the second UE from the second base station to a target base station; communicating an APD identifier of the APD to the target base station; and performing the handover of the second UE to the target base station.

Example 17: The method as recited in example 16, further comprising: communicating, to the target base station, an indication of a phase vector used to configure a surface of the APD for maintaining the second wireless link with the second UE.

Example 18: The method as recited in example 17, wherein the target base station is the first base station.

Example 19: A method performed by a first base station for sharing an adaptive phase-changing device with a second base station, the method comprising: using an adaptive phase-changing device, APD in a communication path for a first wireless link with a first UE; receiving, from a second base station, a request to apportion access to the APD; apportioning access to the APD with the second base station; and using the APD in the communication path for the first wireless link with the first UE based on the apportioned access.

Example 20: The method as recited in example 19, wherein obtaining the apportioned access to the APD further comprises: coordinating with the second base station or the APD to: apportion a first subset of configurable surface elements from multiple configurable surface of the APD to the first base station; and apportion a second subset of configurable surface elements from the multiple configurable surface elements to the second base station.

Example 21: The method as recited in example 20, wherein using the APD in the communication path for the first wireless link with the first UE further comprises: transmitting a first wireless signal towards the first subset of configurable surface elements concurrently with a second wireless signal transmitted by the second base station towards the second subset of configurable surface elements.

Example 22: The method as recited in example 19 or example 20, wherein obtaining the apportioned access to the APD further comprises: coordinating with the second base station or the APD to apportion the APD to the first base station over a first time-duration; and apportion the APD to the second base station over a second time-duration that does not overlap with the first time-duration.

Example 23: A method performed by a source base station for performing a handover of a user equipment, UE, that uses an adaptive phase-changing device, APD, in a communication path for a wireless link to the source base station to a target base station, the method comprising: using the APD in the communication path for the wireless link with the UE; determining to perform a handover of the UE to a target base station; communicating an APD identifier of the APD to the target base station; negotiating with the target base station to determine one or more handover parameters; and performing the handover of the UE to the target base station.

Example 24: The method as recited in example 23, further comprising: communicating, to the target base station, a surface configuration used to configure a surface of the APD for maintaining the wireless link with the UE.

Example 25: A method performed by a target base station for performing a handover of a user equipment, UE, that uses an adaptive phase-changing device, APD in a communication path for a wireless link to a source base station, the method comprising: receiving, from the source base station, an APD identifier that identifies the APD used by the source base station to maintain the wireless link with the UE; negotiating with the source base station to determine one or more handover parameters for performing a handover of the UE; determining a target-base station-to-user equipment (target-to-UE) surface configuration for a surface of the APD; directing the APD to configure the surface of the APD using the surface configuration; and performing the handover of the UE to the target base station.

Example 26: The method as recited in example 25 further comprising: receiving a source-base station-to-user equipment (source-to-UE) surface configuration from the source base station; and using the source-to-UE surface configuration to determine the target-to-UE surface configuration for reflecting a signal originating from the target base station towards the UE.

Example 27: The method as recited in example 25 or example 26, further comprising: communicating with the UE using the APD.

Example 28: A base station comprising: a processor; and computer-readable storage media comprising instructions, responsive to execution by the processor, that direct the base station to perform a method as recited in any one of claims 1 to 27.

Example 29: A computer-readable storage media comprising instructions that, responsive to execution by a processor, direct the processor to perform a method as recited in any one of examples 1 to 27.

Although aspects of adaptive phase-changing device sharing and handover have been described in language specific to features and/or methods, the subject of the appended claims is not necessarily limited to the specific features or methods described. Rather, the specific features and methods are disclosed as example implementations of adaptive phase-changing device sharing and handover, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

What is claimed is:

1. A method performed by a second base station for sharing an adaptive phase-changing device with a first base station, the method comprising:
   determining to use an adaptive phase-changing device (APD) in a communication path for a second wireless link with a second user equipment (UE);
   identifying a first base station using the APD;
   obtaining apportioned access to the APD;
   configuring a surface of the APD based on the apportioned access; and
   using the APD in the communication path for the second wireless link with the second UE based on the apportioned access.

2. The method as recited in claim 1, wherein the obtaining of the apportioned access to the APD further comprises:
   coordinating with the first base station or the APD by:
      sending a query for APD access information to the first base station; and
      receiving APD access information from the first base station.

3. The method as recited in claim 2, wherein based on the receiving of the APD access information, the obtaining of the apportioned access to the APD further comprises:
   i) apportioning a first subset of configurable surface elements from multiple configurable surface elements of the APD to the first base station, and
   apportioning a second subset of configurable surface elements of the multiple configurable surface elements to the second base station; and/or
   ii) apportioning the APD to the first base station over a first time-duration, and
   apportioning the APD to the second base station over a second time-duration that does not overlap with the first time-duration.

4. The method as recited in claim 1, further comprising:
   receiving, from the second UE, at least one link-quality measurement that is indicative of a channel impairment; and
   determining to use the APD based on the at least one link-quality measurement that is indicative of the channel impairment.

5. The method as recited in claim 4, wherein the configuring of the surface of the APD further comprises:
   determining, using the at least one link-quality measurement, a surface configuration for the APD that mitigates the channel impairment by transforming characteristics of a wireless signal propagated between the second base station and the second UE; and
   transmitting, to the APD, an indication of the surface configuration using an adaptive phase-changing device wireless control channel, APD-control-channel.

6. The method as recited in claim 5, further comprising:
   apportioning access to the APD-control-channel by negotiating with the first base station.

7. The method as recited in claim 6, wherein the apportioning access to the APD-control-channel further comprises:
   i) apportioning a second resource block of the APD-control-channel to the second base station; and/or
   ii) apportioning a second time slot of the APD-control-channel to the second base station.

8. The method as recited in claim 4, further comprising
   determining, using the at least one link-quality measurement, a surface configuration for the APD that mitigates the channel impairment by transforming characteristics of a wireless signal propagated between the second base station and the second UE;
   communicating the surface configuration to the first base station; and
   directing the first base station to configure the APD using the surface configuration and based on the apportioned access.

9. The method as recited in claim 8, wherein the directing the first base station to configure the APD further comprises:
   implicitly directing the first base station to configure the APD by communicating the surface configuration.

10. The method as recited in claim 8, wherein the directing the first base station to configure the APD further comprises:
    communicating timing information to the second base station that indicates when to apply the surface configuration.

11. The method as recited in claim 1, further comprising:
    determining to perform a handover of the second UE from the second base station to a target base station;
    communicating an APD identifier of the APD to the target base station; and
    performing the handover of the second UE to the target base station.

12. A base station comprising:
    a processor; and
    computer-readable storage media comprising instructions, responsive to execution by the processor, that direct the base station to:
       determine to use an adaptive phase-changing device (APD) in a communication path for a second wireless link with a second user equipment (UE);
       identify another base station using the APD;
       obtain apportioned access to the APD;
       configure a surface of the APD based on the apportioned access; and
       use the APD in the communication path for the second wireless link with the second UE based on the apportioned access.

13. The base station as recited in claim 12, wherein the instructions that are executable to obtain the apportioned access to the APD direct the base station to:
    coordinate with the other base station or the APD by:
       sending a query for APD access information to the other base station; and
       receiving APD access information from the other base station.

14. The base station as recited in claim 13, wherein based on the reception of the APD access information, the instructions that are executable to obtain the apportioned access to the APD direct the base station to:
    i) apportion a first subset of configurable surface elements from multiple configurable surface elements of the APD to the other base station, and
    apportion a second subset of configurable surface elements of the multiple configurable surface elements to the base station; and/or
    ii) apportion the APD to the other base station over a first time-duration, and
    apportion the APD to the base station over a second time-duration that does not overlap with the first time-duration.

15. The base station as recited in claim 12, wherein the instructions to configure the surface of the APD direct the base station to:
- receive, from the second UE, at least one link-quality measurement that is indicative of a channel impairment; and
- determine to use the APD based on the at least one link-quality measurement that is indicative of the channel impairment.

16. The base station as recited in claim 15, the instructions further executable to direct the base station to:
- determine, using the at least one link-quality measurement, a surface configuration for the APD that mitigates the channel impairment by transforming characteristics of a wireless signal propagated between the base station and the second UE; and
- transmit, to the APD, an indication of the surface configuration using an adaptive phase-changing device wireless control channel, APD-control-channel.

17. The base station as recited in claim 16, the instructions further executable to direct the base station to:
- apportion access to the APD-control-channel by negotiating with the other base station.

18. The base station as recited in claim 17, the instructions to apportion access to the APD-control-channel further executable to direct the base station to:
- i) apportion a second resource block of the APD-control-channel to the base station; and/or
- ii) apportion a second time slot of the APD-control-channel to the base station.

* * * * *

UNITED STATES PATENT AND TRADEMARK OFFICE
CERTIFICATE OF CORRECTION

| | | |
|---|---|---|
| PATENT NO. | : 12,513,589 B2 | Page 1 of 1 |
| APPLICATION NO. | : 18/249702 | |
| DATED | : December 30, 2025 | |
| INVENTOR(S) | : Jibing Wang et al. | |

It is certified that error appears in the above-identified patent and that said Letters Patent is hereby corrected as shown below:

On the Title Page

Item (57), Line 5, after "device" before "with", delete "APD," add --(APD),--

Signed and Sealed this
Tenth Day of February, 2026

John A. Squires
*Director of the United States Patent and Trademark Office*